US012597435B2

(12) United States Patent
Tokozume

(10) Patent No.: US 12,597,435 B2
(45) Date of Patent: Apr. 7, 2026

(54) SIGNAL PROCESSING APPARATUS AND SIGNAL PROCESSING METHOD

(71) Applicant: SONY GROUP CORPORATION, Tokyo (JP)

(72) Inventor: Yuji Tokozume, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 18/560,411

(22) PCT Filed: Feb. 28, 2022

(86) PCT No.: PCT/JP2022/008288

§ 371 (c)(1),
(2) Date: Nov. 13, 2023

(87) PCT Pub. No.: WO2022/254834

PCT Pub. Date: Dec. 8, 2022

(65) Prior Publication Data

US 2024/0257828 A1 Aug. 1, 2024

(30) Foreign Application Priority Data

May 31, 2021 (JP) ................................ 2021-091684

(51) Int. Cl.
*G10L 25/78* (2013.01)
*H04R 1/10* (2006.01)

(52) U.S. Cl.
CPC ........... *G10L 25/78* (2013.01); *H04R 1/1091* (2013.01); *G10L 2025/783* (2013.01)

(58) Field of Classification Search
CPC ...... A61F 11/06; G10L 15/28; G10L 21/0208; G10L 21/0216; G10L 25/78; G10L 25/84;
(Continued)

(56) References Cited

U.S. PATENT DOCUMENTS 8,036,898 B2 * 10/2011 Sato ....................... G10L 25/78 704/233
8,699,721 B2 * 4/2014 Burnett .............. G10L 21/0208 381/94.1
(Continued)

FOREIGN PATENT DOCUMENTS

JP 04-230800 A 8/1992
JP 2011-188462 A 9/2011
(Continued)

OTHER PUBLICATIONS

International Search Report and Written Opinion of PCT Application No. PCT/JP2022/008288, issued on May 31, 2022, 09 pages of ISRWO.

*Primary Examiner* — Gerald Gauthier
(74) *Attorney, Agent, or Firm* — CHIP LAW GROUP

(57) ABSTRACT

Provided is a signal processing apparatus, signal processing method, and program capable of detecting an utterance by a wearer even in a state where sound is output from a vibration reproduction apparatus. A signal processing apparatus including a processing unit that operates corresponding to a vibration reproduction apparatus including a vibration reproduction unit that reproduces vibration and a vibration sensor that detects vibration, and performs processing of making it difficult to detect an utterance in utterance detection processing of detecting an utterance by a wearer of the vibration reproduction apparatus on the basis of the vibration sensor signal.

17 Claims, 17 Drawing Sheets

(58) Field of Classification Search
CPC ... G10L 25/93; G10L 2025/783; G10L 19/00; G10L 21/0364; G10L 25/90; H02J 50/90; H04H 60/33; H04R 1/1008; H04R 1/08; H04R 1/1041; H04R 1/1083; H04R 1/1091; H04R 1/46; H04R 3/005; H04R 25/453; H04R 25/50; H04R 2460/01; H04R 2460/13; H04R 3/007; A61B 5/123; A61M 21/02; G09B 19/04; H03G 3/20; H04N 5/602; H04N 9/79
See application file for complete search history.

(56) References Cited

U.S. PATENT DOCUMENTS 8,751,224 B2 * 6/2014 Herve ................. G10L 21/0364 704/226
10,880,657 B2 * 12/2020 Burns .................. H04R 25/453
11,276,384 B2 * 3/2022 Woodruff ............. H04R 1/1008
12,277,950 B2 * 4/2025 Weng ................... H04R 1/1083
2002/0176566 A1 11/2002 Song
2003/0040908 A1 * 2/2003 Yang ...................... H04R 3/005 704/233
2003/0097254 A1 * 5/2003 Holzrichter ............. G10L 19/00 704/201
2004/0249633 A1 * 12/2004 Asseily .................... H04R 1/46 704/200
2006/0217977 A1 * 9/2006 Gaeta .................. G10L 21/0208 704/205
2007/0060446 A1 * 3/2007 Asukai ..................... H03G 3/20 482/8
2007/0233479 A1 * 10/2007 Burnett ................... G10L 25/93 704/233
2009/0287485 A1 * 11/2009 Glebe ...................... H04R 1/08 455/575.1
2010/0172529 A1 * 7/2010 Burns .................... H04R 25/50 381/328
2010/0191143 A1 * 7/2010 Ganter ................... A61B 5/123 600/559
2011/0026722 A1 * 2/2011 Jing ........................ G10L 25/84 381/71.1
2011/0208520 A1 * 8/2011 Lee ......................... G10L 25/78 704/E15.039
2012/0166190 A1 * 6/2012 Lee ..................... G10L 21/0208 704/E15.039
2012/0209603 A1 * 8/2012 Jing ........................ G10L 25/78 704/E15.001
2012/0264091 A1 * 10/2012 Huber .................... G09B 19/04 600/23
2013/0163946 A1 * 6/2013 Fukumoto ................ H04N 9/79 386/224
2013/0246062 A1 * 9/2013 Avargel .................. G10L 25/90 704/E15.039
2014/0095157 A1 * 4/2014 Usher .................... H04R 3/005 704/233
2014/0126737 A1 * 5/2014 Burnett .................. H04R 3/005 381/71.6
2014/0153743 A1 * 6/2014 Otani ..................... H04R 3/007 381/94.2
2014/0188467 A1 * 7/2014 Jing ....................... H04R 3/005 704/233
2015/0216762 A1 * 8/2015 Oohashi ................ A61M 21/02 601/47
2015/0235656 A1 * 8/2015 Kim ........................ G10L 15/28 455/563
2018/0130482 A1 5/2018 Michel
2019/0038467 A1 * 2/2019 Beltman ................. A61F 11/06
2019/0223798 A1 * 7/2019 Eriguchi ................ H04H 60/33
2019/0342652 A1 11/2019 Watts
2020/0401164 A1 * 12/2020 Miyazaki ................ H02J 50/90
2021/0297627 A1 * 9/2021 Ichimura ................ H04N 5/602
2022/0132245 A1 * 4/2022 Klimanis ............... H04R 3/005
2022/0301574 A1 * 9/2022 Zheng ................. G10L 21/0216
2024/0257828 A1 * 8/2024 Tokozume ........... H04R 1/1091

FOREIGN PATENT DOCUMENTS

JP 2013-121106 A 6/2013
JP 2020-197712 A 12/2020

* cited by examiner

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2022/008288 filed on Feb. 28, 2022, which claims priority benefit of Japanese Patent Application No. JP 2021-091684 filed in the Japan Patent Office on May 31, 2021. Each of the above-referenced applications is hereby incorporated herein by reference in its entirety.

TECHNICAL FIELD

The present technology relates to a signal processing apparatus, a signal processing method, and a program.

BACKGROUND ART

Conventionally, technology for detecting an utterance by an utterer has been proposed. For example, there is a technique for detecting an utterance by an utterer by using an acceleration sensor in a sound communication system (Patent Document 1).

CITATION LIST

Patent Document

Patent Document 1: Japanese Patent Application Laid-Open No. 2011-188462

SUMMARY OF THE INVENTION

Problems to be Solved by the Invention

A case where the technique in Patent Document 1 is applied to a headphone including an acceleration sensor to detect an utterance by a person wearing the headphone will be considered. If large volume sound is output from a loudspeaker of the headphone, vibration of a housing of the headphone due to the output of the sound is transmitted to the acceleration sensor, and thus there is a possibility that performance of detecting the utterance by the utterer deteriorates. For example, if human voice is included in music that is output, as a result of the transmission of the vibration of the housing due to the output of the sound from the loudspeaker to the acceleration sensor, a vibration pattern similar to a vibration pattern when a wearer utters enters in the acceleration sensor, in which case it is erroneously detected that the utterer is uttering although the utterer is not uttering.

The present technology has been made in view of such a problem, and an object thereof is to provide a signal processing apparatus, signal processing method, and program capable of detecting an utterance by a wearer even in a state where sound is output from a vibration reproduction apparatus.

Solutions to Problems

In order to solve the above-described problem, a first technique is a signal processing apparatus including a processing unit that operates corresponding to a vibration reproduction apparatus including a vibration reproduction unit that reproduces vibration and a vibration sensor that detects vibration, and performs processing of making it difficult to detect an utterance in utterance detection processing of detecting an utterance by a wearer of the vibration reproduction apparatus on the basis of the vibration sensor signal.

Furthermore, a second technique is a signal processing method including being executed corresponding to a vibration reproduction apparatus including a vibration reproduction unit that reproduces vibration and a vibration sensor that detects vibration, and performing processing of making it difficult to detect an utterance in utterance detection processing of detecting an utterance by a wearer of the vibration reproduction apparatus on the basis of a vibration sensor signal.

Moreover, a third technique is a program that causes a computer to execute a signal processing method including being executed corresponding to a vibration reproduction apparatus including a vibration reproduction unit that reproduces vibration and a vibration sensor that detects vibration, and performing processing of making it difficult to detect an utterance in utterance detection processing of detecting an utterance by a wearer of the vibration reproduction apparatus on the basis of a vibration sensor signal.

MODE FOR CARRYING OUT THE INVENTION

Hereinafter, an embodiment of the present technology will be described with reference to the drawings. Note that the description will be made in the following order.

<1. First embodiment>
[1-1. Configuration of vibration reproduction apparatus]
[1-2. Configuration of signal processing apparatus 200]
[1-3. Processing by signal processing apparatus 200]
<2. Second embodiment>
[2-1. Configuration of signal processing apparatus 200]
[2-2. Processing by signal processing apparatus 200]
<3. Third embodiment>
[3-1. Configuration of signal processing apparatus 200]
[3-2. Processing by signal processing apparatus 200]
<4. Fourth embodiment>
[4-1. Configuration of signal processing apparatus 200]
[4-2. Processing by signal processing apparatus 200]
<5. Fifth embodiment>
[5-1. Configuration of signal processing apparatus 200]
[5-2. Processing by signal processing apparatus 200]
<6. Sixth embodiment>
[6-1. Configuration of signal processing apparatus 200]
[6-2. Processing by signal processing apparatus 200]
<7. Application example>
<8. Modifications>

1. First Embodiment

[1-1. Configuration of Vibration Reproduction Apparatus]

Figure 1A:
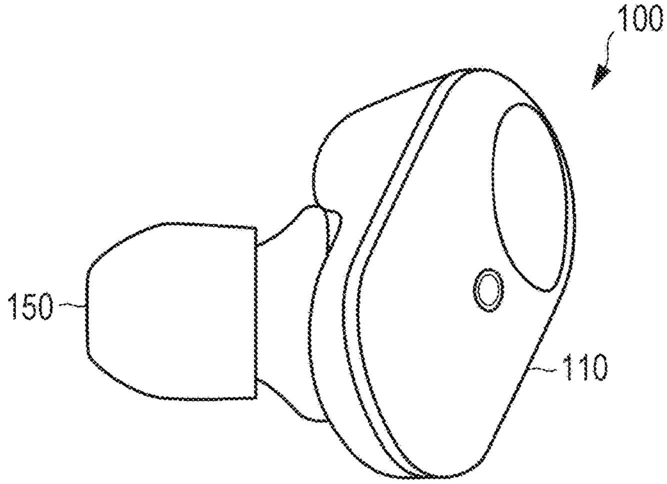
FIG. 1A is an external view illustrating an external configuration of a headphone 100.
Figure 1B:
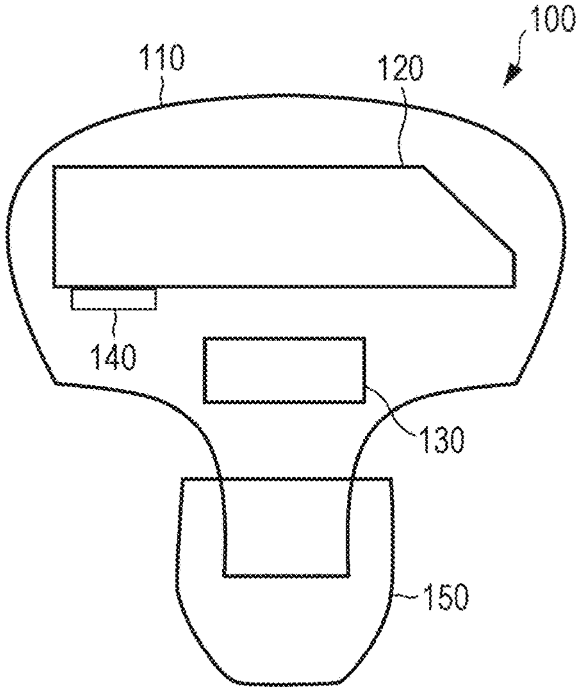
FIGS. 1B and 1C are cross-sectional views illustrating an internal configuration of the headphone 100.
Figure 1C:
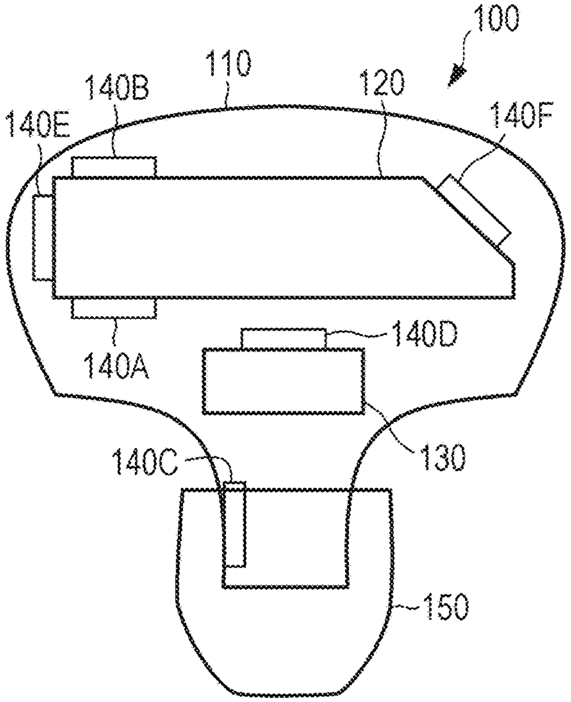

With reference to FIGS. 1A, 1B, and 1C, a configuration of a headphone 100 as a vibration reproduction apparatus including a vibration reproduction unit 130 and a vibration sensor 140 will be described. The configuration of the headphone 100 is common to first to fourth embodiments. Note that the headphones 100 include a pair of a left headphone and a right headphone, and description will be made with reference to the left headphone. In the following description, a person who wears and uses the headphone 100 is referred to as a wearer.

Note that the vibration reproduction apparatus may be either wearable or stationary, and examples of the wearable vibration reproduction apparatus include headphones, earphones, neck speakers, and the like. Examples of the headphones include overhead headphones, neck-band headphones, and the like, and examples of the earphone include inner-ear-type earphones, canal-type earphones, and the like. Furthermore, some of the earphones are referred to as true wireless earphones, full wireless earphones, or the like, which are completely independent wireless earphones. Furthermore, there are also wireless headphones and neck speakers. Note that the vibration reproduction apparatus is not limited to a wireless type, and may be a wired type.

The headphone 100 include a housing 110, a substrate 120, the vibration reproduction unit 130, the vibration sensor 140, and an earpiece 150. The headphone 100 is so-called a canal-type wireless headphone. Note that the headphone 100 may also be referred to as an earphone. The headphone 100 outputs, as sound, a reproduction signal transmitted from an electronic device connected, synchronized, paired, or the like with the headphone 100.

The housing 110 functions as an accommodation part that accommodates the substrate 120, the vibration reproduction unit 130, the vibration sensor 140, and the like therein. The housing 110 is formed by using, for example, synthetic resin such as plastic.

The substrate 120 is a circuit board on which a processor, a micro controller unit (MCU), a battery charging IC, and the like are provided. Processing by the processor implements a reproduction signal processing unit, a signal output unit 121, a signal processing apparatus 200, a communication unit, and the like. The reproduction signal processing unit and the communication unit are not illustrated.

For example, the reproduction signal processing unit performs predetermined sound signal processing such as signal amplification processing or equalizing processing on a reproduction signal reproduced from the vibration reproduction unit 130.

The signal output unit 121 outputs the reproduction signal processed by the reproduction signal processing unit to the vibration reproduction unit 130. The reproduction signal is, for example, a sound signal. The reproduction signal may be an analog signal or a digital signal. Note that sound output from the vibration reproduction unit 130 by the reproduction signal may be music, sound other than music, or voice of a person.

The signal processing apparatus 200 performs signal processing according to the present technology. A configuration of the signal processing apparatus 200 will be described later.

The communication unit communicates with the right headphone and a terminal device by wireless communication. Examples of a communication method include Bluetooth (registered trademark), near field communication (NFC), and Wi-Fi, but any communication method may be used as long as communication can be performed.

The vibration reproduction unit 130 reproduces vibration on the basis of the reproduction signal. The vibration reproduction unit 130 is, for example, a driver unit or loudspeaker that outputs, as sound, a sound signal as a reproduction signal.

The vibration reproduced by the vibration reproduction unit 130 may be vibration due to music output or vibration due to sound or voice output other than music. Furthermore, in a case where the headphone 100 has a noise canceling function, the vibration reproduced from the vibration reproduction unit 130 may be vibration due to output of a noise canceling signal as the reproduction signal, or may be vibration due to output of a sound signal to which the noise canceling signal is added. In a case where the headphone 100 has an external sound capturing function, the vibration reproduced from the vibration reproduction unit 130 may be vibration due to output of an external sound capturing signal as the reproduction signal, or may be vibration due to output of a sound signal to which the external sound capturing signal is added.

In the following first to fourth embodiments, description will be given assuming that the vibration reproduction unit 130 is a driver unit that outputs, as sound, a sound signal as a reproduction signal. When sound is output from the vibration reproduction unit 130 as the driver unit, the housing 110 vibrates, and the vibration sensor 140 senses the vibration.

The vibration sensor 140 senses vibration of the housing 110. The vibration sensor 140 is intended to sense vibration of the housing 110 due to an utterance by the wearer and vibration of the housing 110 due to sound output from the vibration reproduction unit 130, and is different from a microphone intended to sense vibration of air. Because the vibration sensor 140 senses vibration of the housing 110, and the microphone senses vibration of air, vibration media thereof are different from each other. Therefore, in the present technology, the vibration sensor 140 does not include a microphone. The vibration sensor 140 is, for example, an acceleration sensor, and in this case, the vibration sensor 140 is configured to sense displacement in position of a member inside the sensor, and is different in configuration from the microphone.

The vibration sensor 140 senses vibration of the housing 110 and outputs, to the signal processing apparatus 200, a vibration sensor signal obtained as a result of the sensing.

As the vibration sensor 140, in addition to the acceleration sensor, a voice pick up (VPU) sensor, a bone conduction sensor, or the like can be used. The acceleration sensor may be a biaxial acceleration sensor or an acceleration sensor having two or more axes (for example, a triaxial acceleration sensor). In a case of the acceleration sensor having two or more axes, vibration in a plurality of directions can be measured, and therefore, vibration of the vibration reproduction unit 130 can be sensed with higher accuracy.

As illustrated with a vibration sensor 140A, vibration sensor 140B, and vibration sensor 140D in FIG. 1C, the vibration sensor 140 may be disposed so as to be parallel to a vibration surface of the vibration reproduction unit 130.

Furthermore, as illustrated with a vibration sensor 140C, vibration sensor 140E, and vibration sensor 140F in FIG. 1C, the vibration sensor 140 may be disposed so as to be perpendicular or oblique to the vibration surface of the vibration reproduction unit 130. As a result, it is possible to make it difficult to be affected by the vibration reproduction unit 130.

Furthermore, as illustrated with the vibration sensor 140C and vibration sensor 140D in FIG. 1C, the vibration sensor 140 may be disposed coaxially with the vibration surface of the vibration reproduction unit 130.

Furthermore, as illustrated with the vibration sensor 140A, vibration sensor 140B, vibration sensor 140E, and vibration sensor 140F in FIG. 1C, the vibration sensor 140 may be disposed at a position not coaxial with the vibration surface of the vibration reproduction unit 130. As a result, the vibration sensor 140 can be difficult to be affected by the vibration reproduction unit 130.

Furthermore, as illustrated with the vibration sensor 140A, vibration sensor 140B, vibration sensor 140E, and vibration sensor 140F in FIG. 1C, the vibration sensor 140 may be disposed on the substrate 120 that is different from the vibration reproduction unit 130. As a result, transmission of vibration reproduced from the vibration reproduction unit 130 to the vibration sensor 140 can be physically reduced.

Furthermore, as illustrated with the vibration sensor 140D in FIG. 1C, the vibration sensor 140 may be disposed on a surface of the vibration reproduction unit 130. As a result, the vibration of the vibration reproduction unit 130 can be sensed with higher accuracy.

Moreover, as illustrated with the vibration sensor 140C in FIG. 1C, the vibration sensor 140 may be disposed on an inner surface of the housing 110. As a result, transmission of vibration reproduced from the vibration reproduction unit 130 to the vibration sensor 140 can be physically reduced. Moreover, because the vibration can be sensed at a position closer to skin of the wearer, the sensing accuracy can be improved.

The earpiece 150 is provided on a tubular protrusion formed on a side of the housing 110 facing an ear of the wearer. The earpiece 150 is referred to as a canal type, for example, and is deeply inserted into an external acoustic opening of the wearer. The earpiece 150 has elasticity by an elastic body such as rubber, and, by being in close contact with an inner surface of the external acoustic opening of the wearer, plays a role of maintaining a state in which the headphone 100 is worn on the ear. Furthermore, by being in close contact with an inner surface of the external acoustic opening of the wearer, the earpiece 150 also plays a role of blocking noise from outside to facilitate listening to sound, and a role of preventing sound from leaking to the outside.

The sound output from the vibration reproduction unit 130 is emitted from a sound emission hole in the earpiece 150 toward the external acoustic opening of the wearer. As a result, the wearer can listen to sound reproduced from the headphone 100.

The headphone 100 is configured as described above. Note that, although description has been made with reference to the left headphone, the right headphone may be configured as described above.

[1-2. Configuration of Signal Processing Apparatus 200]

Figure 2:
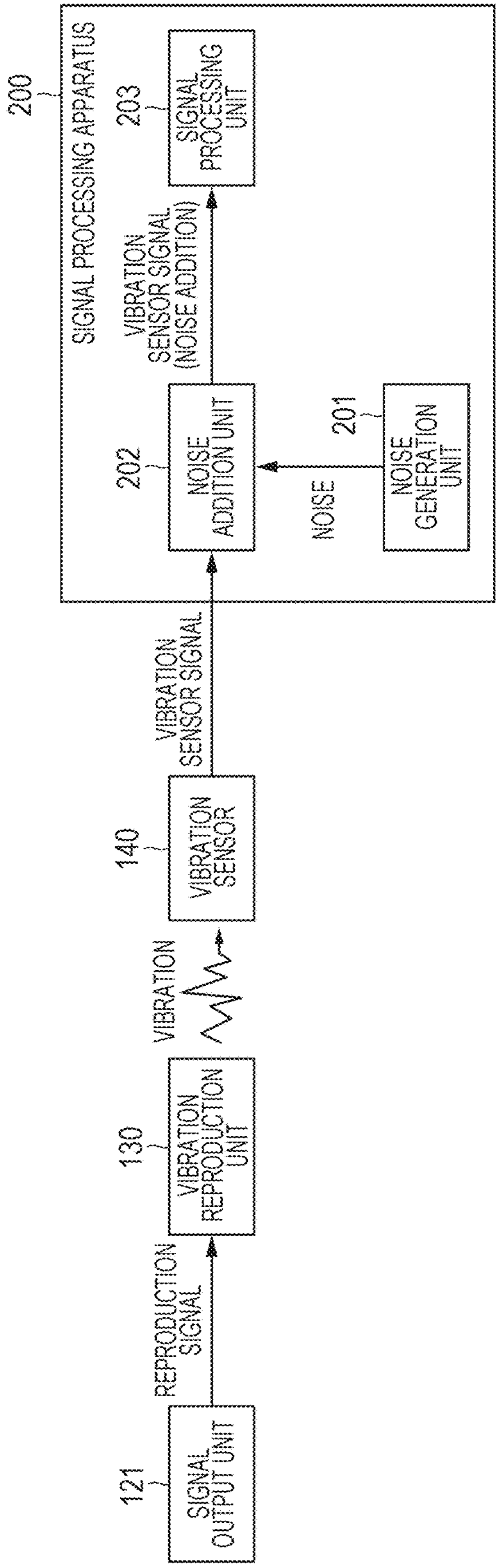
FIG. 2 is a block diagram illustrating a configuration of a signal processing apparatus 200 according to a first embodiment.

Next, a configuration of the signal processing apparatus 200 will be described with reference to FIG. 2. The signal processing apparatus 200 includes a noise generation unit 201, a noise addition unit 202, and a signal processing unit 203.

The noise generation unit 201 generates noise to be added to a vibration sensor signal output from the vibration sensor 140 to the signal processing unit 203, and outputs the noise to the noise addition unit 202. White noise, narrow-band noise, pink noise, or the like, for example, can be used as the noise. The present technology is not limited to certain noise, and a type of the noise is not limited as long as a signal is different from a characteristic of vibration of a detection target. Furthermore, noise may be selectively used according to the reproduction signal. For example, noise is selectively used depending on whether the sound output from the vibration reproduction unit 130 by the reproduction signal is male voice (male vocal in a case of music) or female voice (female vocal in a case of music).

The noise addition unit 202 performs processing of adding the noise generated by the noise generation unit 201 to the vibration sensor signal output from the vibration sensor 140. By adding the noise, a transmission component of the vibration to the vibration sensor 140 is masked, the vibration being reproduced by the sound output from the vibration reproduction unit 130. The noise addition unit 202 corresponds to a processing unit in the claims.

The noise addition unit 202, which is a processing unit, changes a vibration sensor signal so that an utterance is difficult to detect in utterance detection processing by the signal processing unit 203.

The signal processing unit 203 detects the utterance by the wearer on the basis of the vibration sensor signal to which the noise is added by the noise addition unit 202. With, for example, a neural network constructed by using a machine learning technique, a neural network constructed by using a deep learning technique, or the like, the signal processing unit 203 detects the utterance by the wearer, by detecting, from the vibration sensor signal, the vibration of the housing 110 due to the utterance by the wearer.

In the present technology, the signal processing unit 203 detects an utterance by a wearer, and thus, it is not preferable to detect an utterance by a person around the wearer. Generally, detection of an utterance is performed by a microphone provided in the headphone 100, but it is difficult with the microphone to identify whether the utterance is made by the wearer or by another person. Furthermore, a plurality of microphones is required to identify whether the wearer is uttering or another person is uttering. It is possible to provide a plurality of microphones in a headband-type headphones having a large housing, but it is difficult to provide a plurality of microphones in a canal-type headphone having a small housing 110.

Therefore, by using the vibration sensor 140 instead of the microphone to sense the vibration of the housing 110 due to an utterance by the wearer, the utterance by the wearer, not by another person, is detected. Even if another person utters, the vibration sensor 140 does not sense vibration due to an utterance by the another person, or even if the vibration is sensed, the vibration is a slight vibration, and therefore, it is possible to prevent an utterance by the another person from being erroneously detected as an utterance by the wearer.

The signal processing apparatus 200 is configured as described above. Note that, in any of the first to fourth embodiments, the signal processing apparatus 200 may be configured as a single apparatus, may operate in the headphone 100 that is a vibration reproduction apparatus, or may operate in an electronic device or the like connected, synchronized, paired, or the like with the headphone 100. In a case where the signal processing apparatus 200 operates in such an electronic device or the like, the signal processing apparatus 200 operates corresponding to the headphone 100. Furthermore, by execution of the program, the headphone 100 and the electronic device may be implemented to have a function of the signal processing apparatus 200. In a case where the signal processing apparatus 200 is implemented by the program, the program may be installed in the headphone 100 or the electronic device in advance, or may be distributed by a download, a storage medium, or the like and installed by a user himself/herself.

[1-3. Processing by Signal Processing Apparatus 200]

Figure 3:
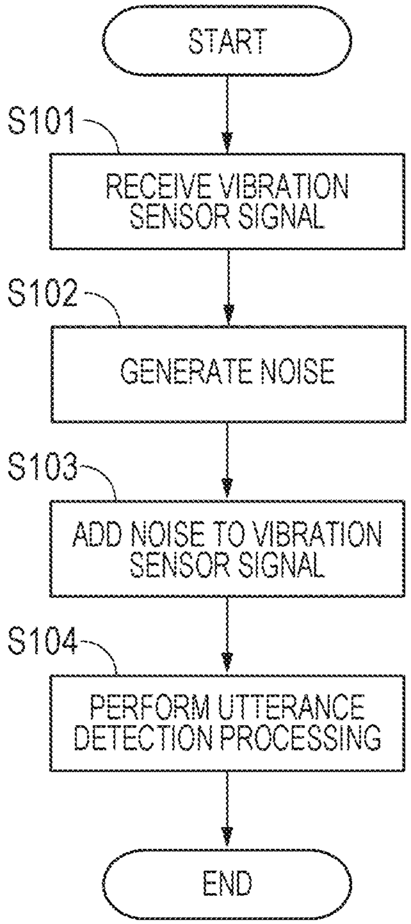
FIG. 3 is a flowchart illustrating processing by the signal processing apparatus 200 according to the first embodiment.

Next, processing by the signal processing apparatus 200 in the first embodiment will be described with reference to FIGS. 3 and 4.

The vibration sensor 140 senses vibration of the housing 110 and outputs, to the signal processing apparatus 200, a vibration sensor signal obtained as a result of the sensing. When the vibration sensor 140 outputs a vibration sensor signal, the noise addition unit 202 receives the vibration sensor signal in Step S101.

Furthermore, in Step S102, the noise generation unit 201 generates noise and outputs the noise to the noise addition unit 202. Note that Step S102 does not necessarily need to be performed after Step S101 and may be performed before Step S101, or Step S101 and Step S102 may be performed almost simultaneously.

Next, in Step S103, the noise addition unit 202 adds the noise generated by the noise generation unit 201 to the vibration sensor signal, and outputs, to the signal processing unit 203, the vibration sensor signal to which the noise is added. The noise addition unit 202 adds noise to the vibration sensor signal while the vibration sensor 140 senses the vibration of the housing 110 and the vibration sensor signal is input to the noise addition unit 202.

Next, in Step S104, the signal processing unit 203 performs utterance detection processing on the basis of the vibration sensor signal to which noise is added by the noise addition unit 202. In a case where the signal processing unit 203 detects an utterance by the wearer, the signal processing unit 203 outputs, to an external processing unit or the like, information indicating a result of the detection.

Figure 4A:
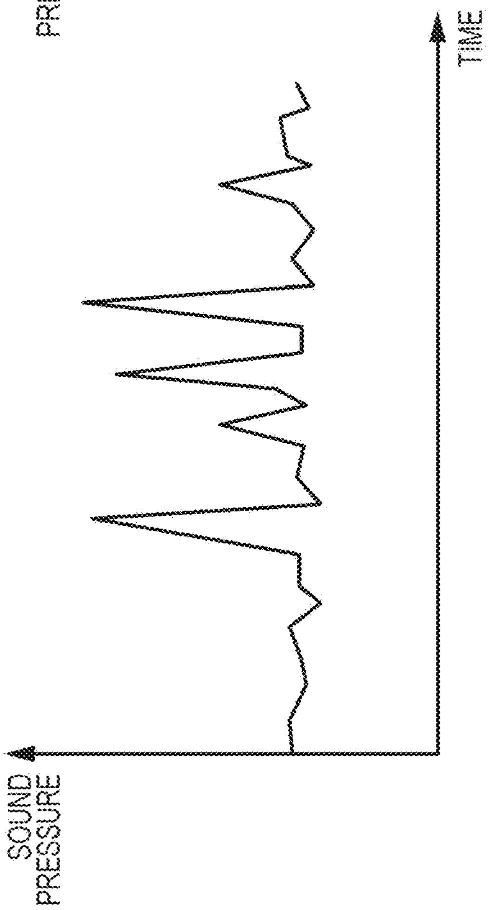
FIGS. 4A and 4B are explanatory diagrams of processing by the signal processing apparatus 200 in the first embodiment.

FIG. 4A is an example in which a transmission component of the vibration of the housing 110 to the vibration sensor 140 is represented by a relation between time and sound pressure that are obtained from a vibration sensor signal, the vibration being due to the sound output from the vibration reproduction unit 130. In FIG. 4A, noise is not added to the vibration sensor signal. Therefore, in a case where human voice is included in the sound output from the vibration reproduction unit 130, a vibration pattern similar to a vibration pattern in a case where the wearer utters is input to the vibration sensor 140 even though the wearer is not uttering. In this case, the vibration sensor 140 may sense the vibration of the housing 110 due to the voice in the sound output from the vibration reproduction unit 130, and the signal processing unit 203 may erroneously detect that the wearer has uttered.

Figure 4B:
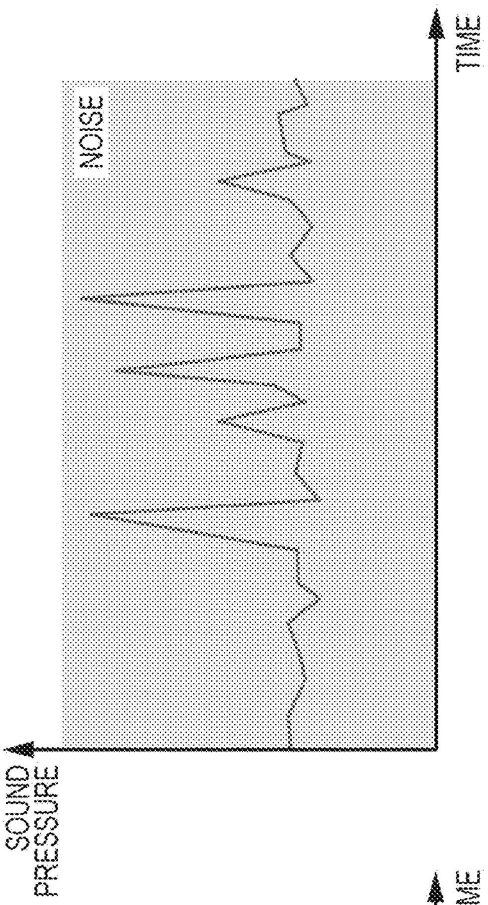

In the first embodiment, noise is added to a vibration sensor signal to prevent this erroneous detection. By adding noise to the vibration sensor signal, a transmission component of the vibration of the housing 110 to the vibration sensor 140 changes as illustrated in FIG. 4B and is masked by the noise. As a result, even if human voice is included in sound output from the vibration reproduction unit 130, a vibration pattern of a vibration sensor signal in a case where vibration of the housing 110 due to sound from the vibration reproduction unit 130 is sensed is not similar to a vibration pattern of a vibration sensor signal in a case where vibration of the housing 110 due to an utterance by the wearer is sensed. Addition of noise differentiates the vibration sensor signal from a vibration sensor signal in a case where vibration due to human voice is sensed, by which it is possible to prevent the signal processing unit 203 from erroneously detecting an utterance by the wearer.

Note that, in a case where a magnitude of voice of an utterance by the wearer is sufficiently greater than a magnitude of sound output from the vibration reproduction unit 130, masking is not performed even if noise is added to the vibration sensor signal indicating vibration of the housing 110 due to the utterance by the wearer, and therefore, the signal processing unit 203 can detect the utterance by the wearer on the basis of that even for a vibration sensor signal to which the noise is added.

Processing by the signal processing apparatus 200 in the first embodiment is performed as described above.

2. Second Embodiment

[2-1. Configuration of Signal Processing Apparatus 200]

Figure 5:
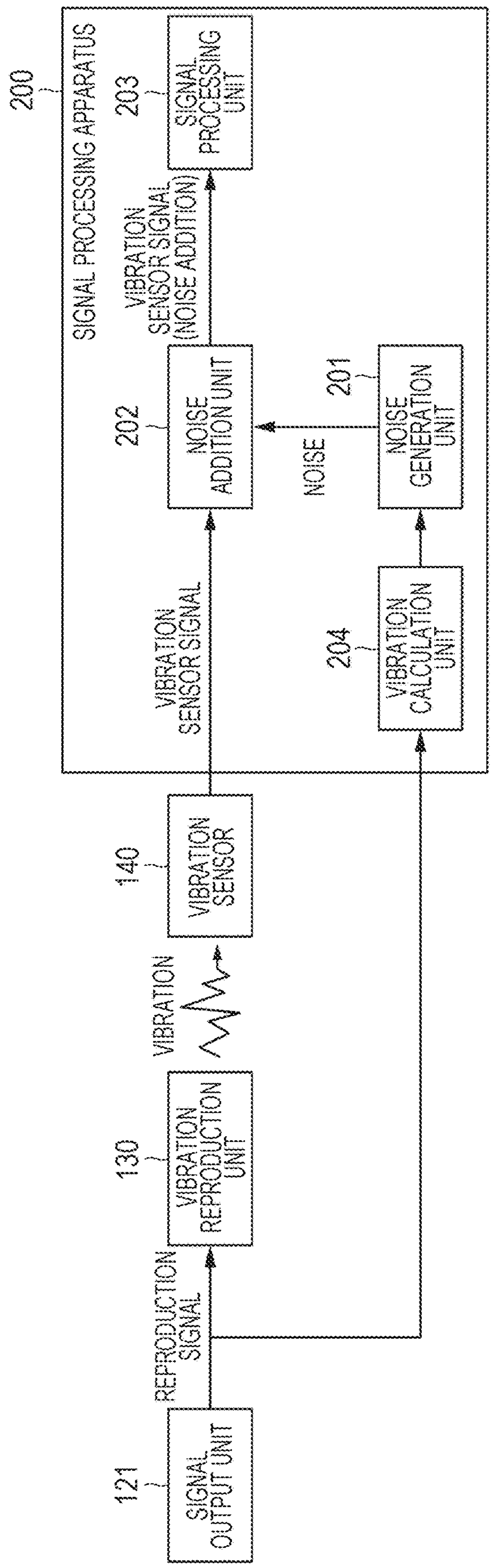
FIG. 5 is a block diagram illustrating a configuration of a signal processing apparatus 200 according to a second embodiment.

Next, a configuration of a signal processing apparatus 200 according to a second embodiment will be described with reference to FIG. 5. Configuration of a headphone 100 is similar to the configuration of the headphone 100 in the first embodiment.

The signal processing apparatus 200 includes a vibration calculation unit 204, a noise generation unit 201, a noise addition unit 202, and a signal processing unit 203.

The vibration calculation unit 204 calculates an instantaneous magnitude of a reproduction signal for outputting sound from a vibration reproduction unit 130. The vibration calculation unit 204 outputs a calculation result to the noise generation unit 201. The magnitude of the reproduction signal includes an instantaneous magnitude, and "instantaneous" is, for example, in units of milliseconds, but the present technology is not limited thereto. The magnitude of the reproduction signal may be a peak of vibration within a predetermined time or an average within a predetermined time.

When calculating the instantaneous magnitude of a reproduction signal, the vibration calculation unit 204 may cut out a certain time interval of the reproduction signal reproduced by the vibration reproduction unit 130, apply a filter such as a high-pass filter, a low-pass filter, or a band-pass filter as necessary, and obtain energy (a root mean square value or the like) of a subsequent reproduction signal.

The noise generation unit 201 determines, on the basis of a result of the calculation by the vibration calculation unit 204, a magnitude of noise to be added to the vibration sensor signal, and generates noise. The noise generation unit 201 increases the generated noise if the magnitude of the reproduction signal is great and decreases the generated noise if the magnitude of the reproduction signal is small in order to temporally change the magnitude of the noise according to the instantaneous magnitude of the reproduction signal, so that the magnitude of the noise is proportional to the magnitude of the reproduction signal.

Furthermore, how much sound pressure of the sound output from the vibration reproduction unit 130 is transmitted to a vibration sensor 140 is predicted in advance, and the magnitude of the noise can be determined on the basis of the predicted value. For example, in a case where it is known in advance that a magnitude of a signal recorded in the vibration sensor 140 by transmission, to the vibration sensor 140, of a vibration of a housing 110 due to sound output from the vibration reproduction unit 130 is 0.1 times a magnitude of a reproduction signal for outputting sound from the vibration reproduction unit 130, and in a case where a magnitude of the sound output from the vibration reproduction unit 130 is A, a magnitude of noise generated by the noise generation unit 201 is only required to be set to 0.1 A.

Thus, in the second embodiment, the magnitude of the noise added to the vibration sensor signal is temporally changed according to an instantaneous magnitude of a reproduction signal for outputting sound from the vibration reproduction unit 130.

Note that, as in the first embodiment, white noise, narrow-band noise, pink noise, or the like, for example, can be used as the noise. The type of the noise is not limited as long as the signal is different from a characteristic of vibration of a detection target, and the noise may be selectively used according to the reproduction signal.

As in the first embodiment, the noise addition unit 202 adds the noise generated by the noise generation unit 201 to the vibration sensor signal, and outputs the vibration sensor signal to the signal processing unit 203.

As in the first embodiment, the signal processing unit 203 detects an utterance by a wearer on the basis of the vibration sensor signal to which the noise has been added by the noise addition unit 202.

The signal processing apparatus 200 according to the second embodiment is configured as described above.

[2-2. Processing by Signal Processing Apparatus 200]

Figure 6:
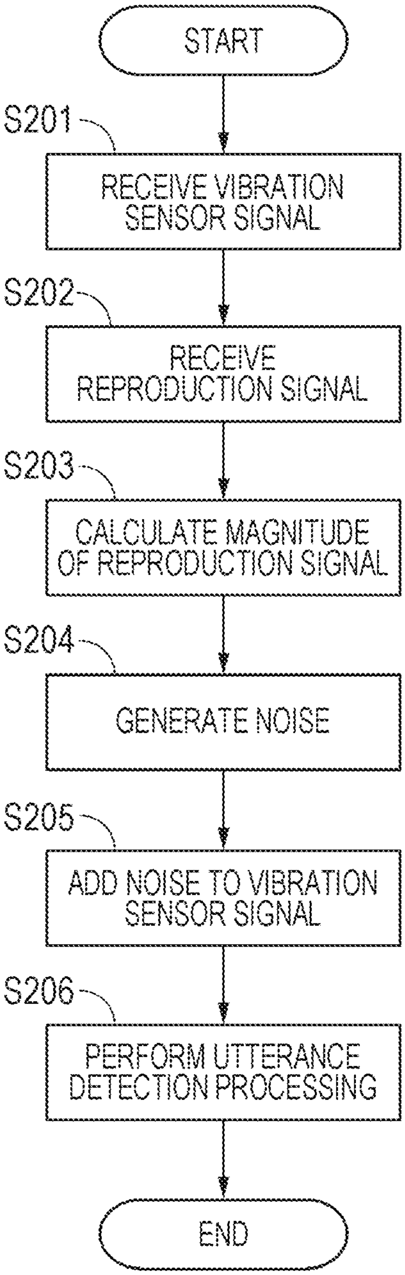
FIG. 6 is a flowchart illustrating processing by the signal processing apparatus 200 according to the second embodiment.

Next, processing by the signal processing apparatus 200 in the second embodiment will be described with reference to FIGS. 6 and 7.

The vibration sensor 140 senses vibration of the housing 110 and outputs, to the signal processing apparatus 200, a vibration sensor signal obtained as a result of the sensing. When the vibration sensor 140 outputs a vibration sensor signal, the noise addition unit 202 receives the vibration sensor signal in Step S201.

Furthermore, when a reproduction signal is output from a signal output unit 121, the vibration calculation unit 204 receives the reproduction signal in Step S202.

Next, in Step S203, the vibration calculation unit 204 calculates an instantaneous magnitude of the reproduction signal. The vibration calculation unit 204 outputs a calculation result to the noise generation unit 201. Note that Steps S202 and S203 do not necessarily need to be performed after Step S201, and may be performed before Step S201, or performed almost simultaneously with Step S201.

Next, in Step S204, the noise generation unit 201 generates, on the basis of the magnitude of the reproduction signal calculated by the vibration calculation unit 204, noise to be added to the vibration sensor signal, and outputs the noise to the noise addition unit 202.

Next, in Step S205, the noise addition unit 202 adds the noise to the vibration sensor signal, and outputs, to the signal processing unit 203, the vibration sensor signal to which the noise has been added. The noise addition unit 202 adds noise to the vibration sensor signal while the vibration sensor 140 senses a vibration generated due to sound output from the vibration reproduction unit 130 and the vibration sensor signal is input to the noise addition unit 202.

Next, in Step S206, the signal processing unit 203 performs utterance detection processing on the basis of the vibration sensor signal to which noise has been added by the noise addition unit 202. The utterance detection processing is performed by a method similar to the method for the utterance detection processing in the first embodiment. In a case where the signal processing unit 203 detects an utterance by the wearer, the signal processing unit 203 outputs, to an external processing unit or the like, information indicating a result of the detection.

Figure 7B:
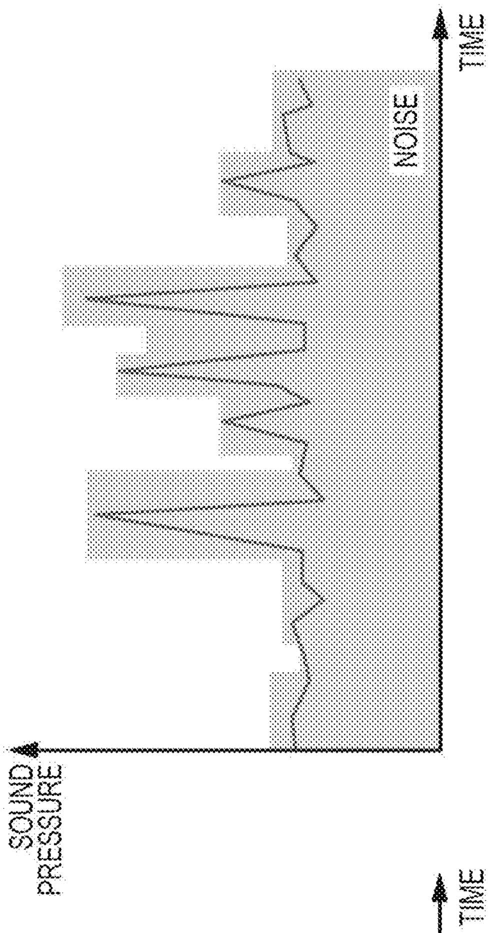
FIGS. 7A and 7B are explanatory diagrams of processing by the signal processing apparatus 200 in the second embodiment.
Figure 7A:
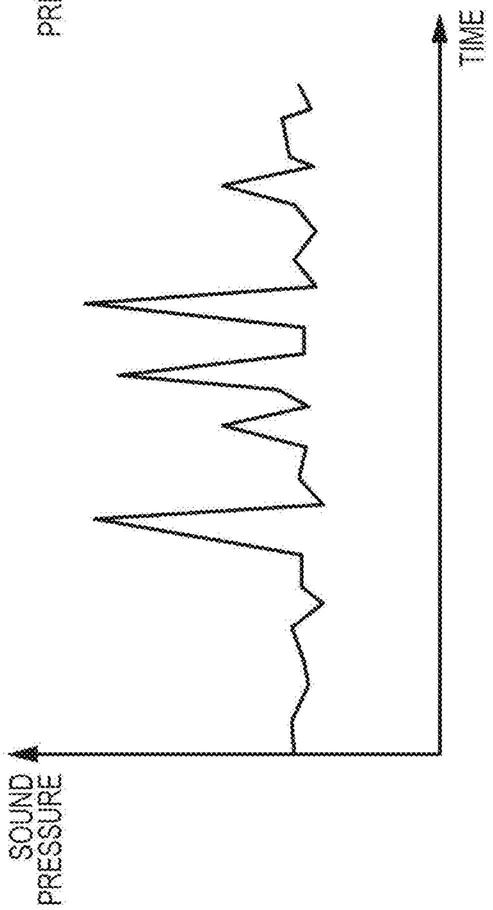

FIG. 7A is an example in which a transmission component of the vibration of the housing 110 to the vibration sensor 140 is represented by a relation between time and sound pressure that are obtained from a vibration sensor signal, the vibration being due to the sound output from the vibration reproduction unit 130. In FIG. 7A, noise is not added to the vibration sensor signal. Therefore, in a case where human voice is included in the sound output from the vibration reproduction unit 130, a vibration pattern similar to a vibration pattern in a case where the wearer utters is input to the vibration sensor 140 even though the wearer is not uttering. In this case, the vibration sensor 140 may sense the vibration of the housing 110 due to the voice in the sound output from the vibration reproduction unit 130, and the signal processing unit 203 may erroneously detect that the wearer has uttered.

Furthermore, adding noise to the vibration sensor signal means adding noise to the vibration sensor signal in a case where the vibration of the housing 110 due to the utterance by the wearer is sensed. As a result, accuracy of detecting the utterance by the wearer by the signal processing unit 203 may deteriorate.

In order to prevent this erroneous detection and deterioration in utterance detection accuracy, in the second embodiment, noise temporally changed according to the instantaneous magnitude of the reproduction signal for outputting sound from the vibration reproduction unit 130 is added to the vibration sensor signal. By adding the noise temporally changed according to the instantaneous magnitude of the reproduction signal to the vibration sensor signal, the greater the vibration of the housing 110, the greater the noise to be added to the vibration sensor signal, and in a case where the vibration of the housing 110 is small, the noise to be added to the vibration sensor signal is small, and a transmission component of the vibration of the housing 110 due to the sound output from the vibration reproduction unit 130 to the vibration sensor 140 changes as illustrated in FIG. 7B, and is masked by the noise.

As a result, even if human voice is included in sound output from the vibration reproduction unit 130, a vibration pattern of a vibration sensor signal in a case where vibration of the housing 110 due to the sound output from the vibration reproduction unit 130 is sensed is not similar to a vibration pattern of a vibration sensor signal in a case where vibration of the housing 110 due to an utterance by the wearer is sensed. Therefore, the vibration sensor signal is differentiated from a vibration sensor signal in a case where vibration due to human voice is sensed, by which it is possible to prevent the signal processing unit 203 from erroneously detecting an utterance by the wearer.

Furthermore, because the noise added to the vibration sensor signal is minimum noise necessary to be temporally changed according to the instantaneous magnitude of the reproduction signal and to mask the transmission component to the vibration sensor 140, the vibration sensor signal is not masked more than necessary. Therefore, it is possible to maintain a success rate of detecting an utterance by the wearer on the basis of the vibration sensor signal.

Processing by the signal processing apparatus 200 in the second embodiment is performed as described above.

Note that, in a case where the instantaneous magnitude of the reproduction signal calculated by the vibration calculation unit 204 is equal to or less than a predetermined threshold value th1, no noise may be added to the vibration sensor signal.

Furthermore, a frequency characteristic of the noise to be added may be changed according to a frequency characteristic of the vibration reproduced from the vibration reproduction unit 130. For example, noise may have a frequency characteristic inversely proportional to the frequency characteristic of the vibration reproduced from the vibration reproduction unit 130, so that the frequency characteristic of the vibration sensor signal after noise is added may be flat.

The vibration sensor 140 senses vibration of the housing 110 and outputs, to the signal processing apparatus 200, a vibration sensor signal obtained as a result of the sensing. In the first and second embodiments, the utterance detection is performed by the signal processing unit 203 after adding noise to the vibration sensor signal. If the magnitude of the sound of the utterance by the wearer is sufficiently greater than the voice output from the vibration reproduction unit 130, even if the transmission component of the vibration of the housing 110 due to the sound output from the vibration reproduction unit 130 is masked by the noise, the transmission component of the vibration of the housing 110 due to the voice of the wearer is not masked by the noise, and therefore, the signal processing unit 203 can detect the utterance by the wearer.

The first and second embodiments can be executed even in a case where the reproduction signal for outputting sound from the vibration reproduction unit 130 and the vibration sensor signal are not strictly temporally synchronized with each other. For example, in a case where a clock of the reproduction signal and a clock of the vibration sensor signal are different from each other, that is, in a case where it is difficult or even impossible to completely synchronize the reproduction signal and the vibration sensor signal depending on a system configuration, the first and second embodiments are effective.

Note that, in the second embodiment, in a case where the vibration reproduced by the vibration reproduction unit 130 is great, noise added to the vibration sensor signal also increases, and the vibration sensor signal is masked, and therefore, accuracy of detecting the utterance by the wearer may decrease. This is because a relative magnitude of the voice of the wearer with respect to the magnitude of the sound output from the vibration reproduction unit 130 is small. Therefore, in such a case, the wearer needs to utter with voice louder than the magnitude of the sound output from the vibration reproduction unit 130.

Figure 8A:
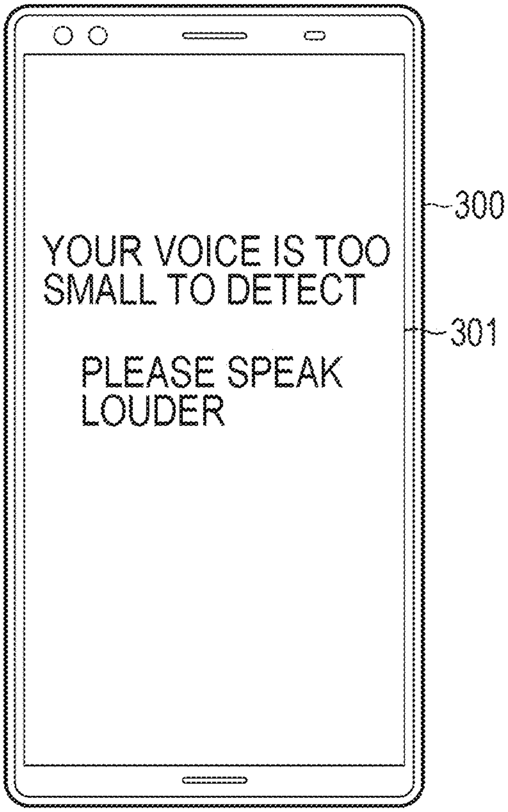
FIGS. 8A and 8B are explanatory diagrams of notification.
Figure 8B:
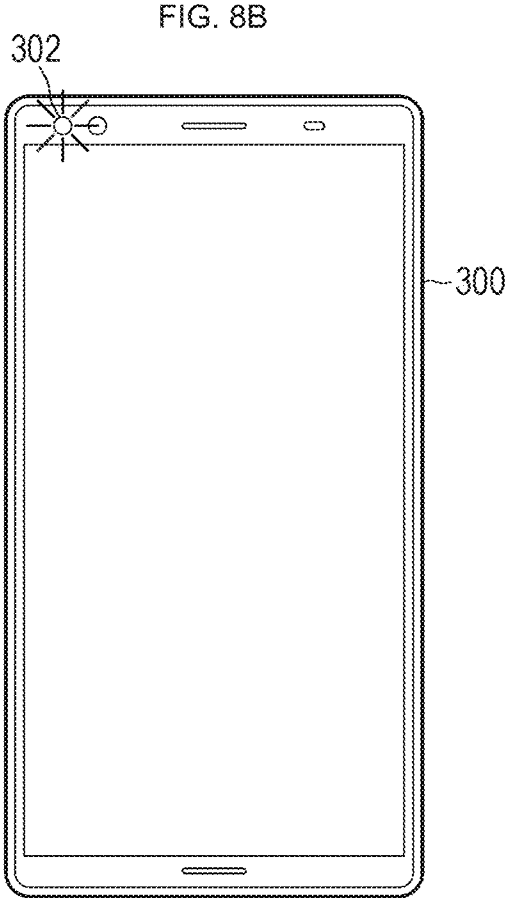

Therefore, in an electronic device 300, such as a smartphone for example, connected, synchronized, paired, or the like with the headphone 100, the wearer may be notified of the fact as illustrated in FIGS. 8A and 8B. Examples of methods for the notification include display of a message or an icon on a screen 301 illustrated in FIG. 8A, and lighting or blinking of the LED 302 illustrated in FIG. 8B. In addition to the smartphone, the electronic device 300 may be a wearable device, a personal computer, a tablet terminal, a head-mounted display, a portable music playback device, or the like.

Alternatively, input operation that allows a wearer to know a reason when an utterance by the wearer cannot be detected may be prepared, and the reason may be notified to the wearer when the input operation is performed on the electronic device 300 or the headphone 100.

3. Third Embodiment

[3-1. Configuration of Signal Processing Apparatus 200]

Figure 9:
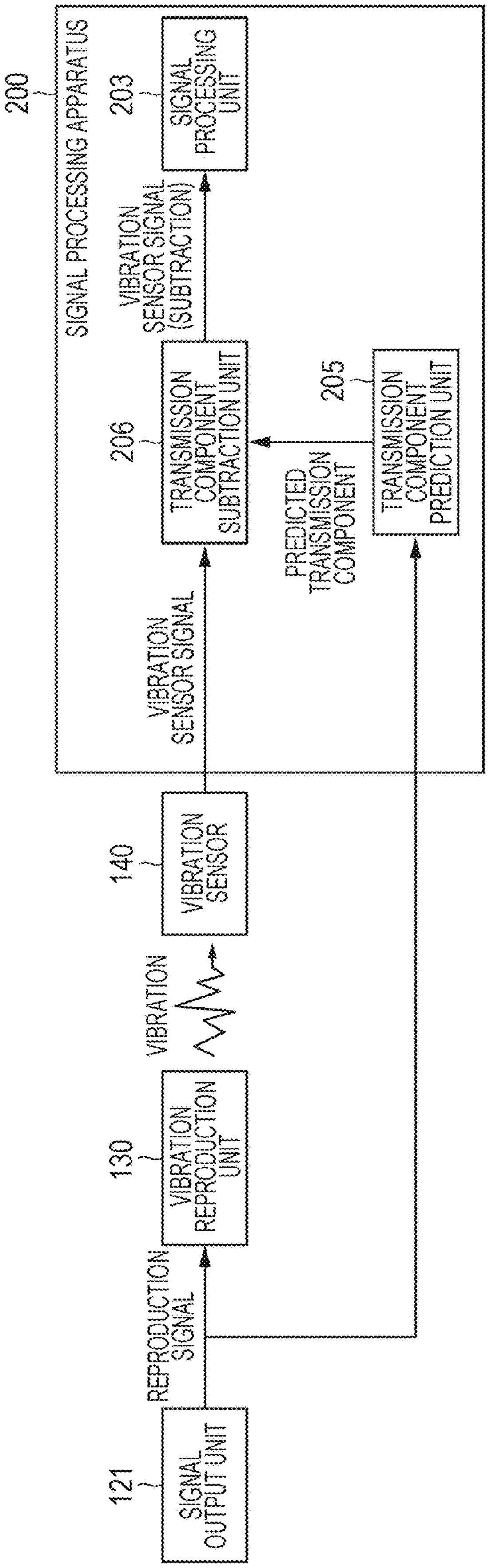
FIG. 9 is a block diagram illustrating a configuration of a signal processing apparatus 200 according to a third embodiment.

Next, a configuration of a signal processing apparatus 200 according to a third embodiment will be described with reference to FIG. 9. Configuration of a headphone 100 is similar to the configuration of the headphone 100 in the first embodiment.

The signal processing apparatus 200 includes a transmission component prediction unit 205, a transmission component subtraction unit 206, and a signal processing unit 203.

On the basis of a reproduction signal output from a signal output unit 121 to a vibration reproduction unit 130, the transmission component prediction unit 205 predicts a transmission component of vibration of a housing 110 due to sound output from the vibration reproduction unit 130 to a vibration sensor 140. The transmission component prediction unit 205 outputs the predicted transmission component to the transmission component subtraction unit 206.

As a method for predicting a transmission component, for example, there is a method in which a characteristic of transmission (impulse response) from the vibration reproduction unit 130 to the vibration sensor 140 is measured in advance (for example, before shipment of a product including the signal processing apparatus 200), and the transmission characteristic measured in advance is convolved in the reproduction signal output as sound from the vibration reproduction unit 130.

Because the transmission characteristic may change depending on a condition such as a magnitude or type of the reproduction signal, transmission characteristics under a plurality of conditions may be measured in advance, and an appropriate transmission characteristic may be selected and convolved according to a condition such as the magnitude of the reproduction signal.

Furthermore, in the headphone 100, the transmission characteristic may change depending on various conditions such as a difference in wearer, a difference in size or material of an earpiece 150, or a difference in state of contact with an ear of the wearer. In order to deal with this, the transmission characteristic may be measured in a state where the wearer uses the headphone 100. In measurement of the transmission characteristic, when a measurement start instruction is given at a timing intended by the wearer, a specified signal such as a sweep signal may be reproduced from the vibration reproduction unit 130, and the transmission characteristic may be obtained on the basis of a signal of the vibration sensor 140 at that time.

In the method described above, because the transmission component subtraction unit 206 subtracts signals in units of samples, a vibration sensor signal and the transmission component predicted by the transmission component prediction unit 205 are required to have the same sampling frequencies and be temporally synchronized with each other in units of samples. In a case where an original sampling frequency of a reproduction signal reproduced by the vibration reproduction unit 130 is different from the sampling frequency of the vibration sensor signal, the above-described prediction method is only required to be performed after sampling frequency conversion is performed. Furthermore, in a case where the reproduction signal and the vibration sensor signal are temporally shifted due to software processing, appropriate synchronization correction processing is only required to be performed. Furthermore, a clock may be shared so that the reproduction signal is synchronized with the vibration sensor signal. Furthermore, clocks of the vibration sensor 140 and vibration reproduction unit 130 and a sampling rate may be synchronized by using a delay circuit.

The transmission component subtraction unit 206 subtracts the transmission component predicted by the transmission component prediction unit 205 from the vibration sensor signal, and outputs, to the signal processing unit 203, the vibration sensor signal subjected to the subtraction processing. The transmission component subtraction unit 206 corresponds to a processing unit in the claims. The transmission component subtraction unit 206, which is a processing unit, changes a vibration sensor signal so that an utterance is difficult to detect in utterance detection processing by the signal processing unit 203.

The signal processing unit 203 detects an utterance by the wearer on the basis of the vibration sensor signal on which the subtraction processing is performed by the transmission component subtraction unit 206. An utterance detection method is similar to the utterance detection method in the first embodiment.

The signal processing apparatus 200 according to the third embodiment is configured as described above.

[3-2. Processing by Signal Processing Apparatus 200]

Figure 10:
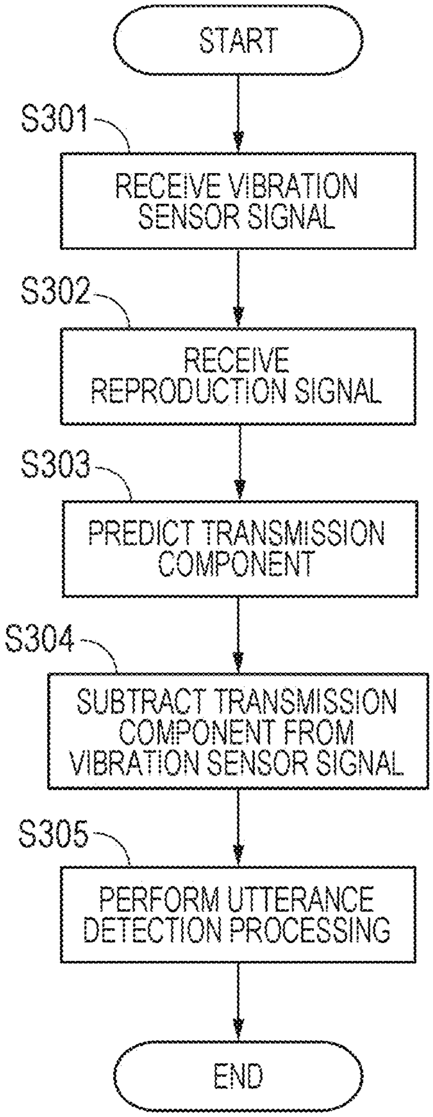
FIG. 10 is a flowchart illustrating processing by the signal processing apparatus 200 according to the third embodiment.

Next, processing by the signal processing apparatus 200 in the third embodiment will be described with reference to FIG. 10.

The vibration sensor 140 senses vibration of the housing 110 and outputs, to the signal processing apparatus 200, a vibration sensor signal obtained as a result of the sensing. When the vibration sensor 140 outputs a vibration sensor signal, the transmission component subtraction unit 206 receives the vibration sensor signal in Step S301.

Furthermore, when a reproduction signal is output from the signal output unit 121, the transmission component prediction unit 205 receives the reproduction signal in Step S302.

Next, in Step S303, the transmission component prediction unit 205 predicts the transmission component on the basis of the reproduction signal, and outputs a result of the prediction to the transmission component subtraction unit 206.

Note that Steps S302 and S303 do not necessarily need to be performed after Step S301, and may be performed before or almost simultaneously with Step S301.

Next, in Step S304, the transmission component subtraction unit 206 subtracts a predicted transmission component from the vibration sensor signal, and outputs the vibration sensor signal subjected to the subtraction processing to the signal processing unit 203. The subtraction of the predicted transmission component from the vibration sensor signal by the transmission component subtraction unit 206 is performed while the vibration sensor 140 senses a vibration generated by the vibration reproduction unit 130 and the vibration sensor signal is input to the noise addition unit 202.

Next, in Step 305, the signal processing unit 203 performs utterance detection processing on the basis of the vibration sensor signal subjected to the subtraction processing. The utterance detection processing is performed by a method similar to the method for the utterance detection processing in the first embodiment. In a case where the signal processing unit 203 detects an utterance by the wearer, the signal processing unit 203 outputs, to an external processing unit or the like, information indicating a result of the detection.

Processing by the signal processing apparatus 200 in the third embodiment is performed as described above. In the third embodiment, the transmission component, which is influence of vibration of the housing 110 due to sound output from the vibration reproduction unit 130 on a vibration sensor signal, is predicted and subtracted from the vibration sensor signal, and therefore, it is possible to prevent deterioration of utterance detection performance due to vibration reproduced by the vibration reproduction unit 130.

4. Fourth Embodiment

[4-1. Configuration of Signal Processing Apparatus 200]

Figure 11:
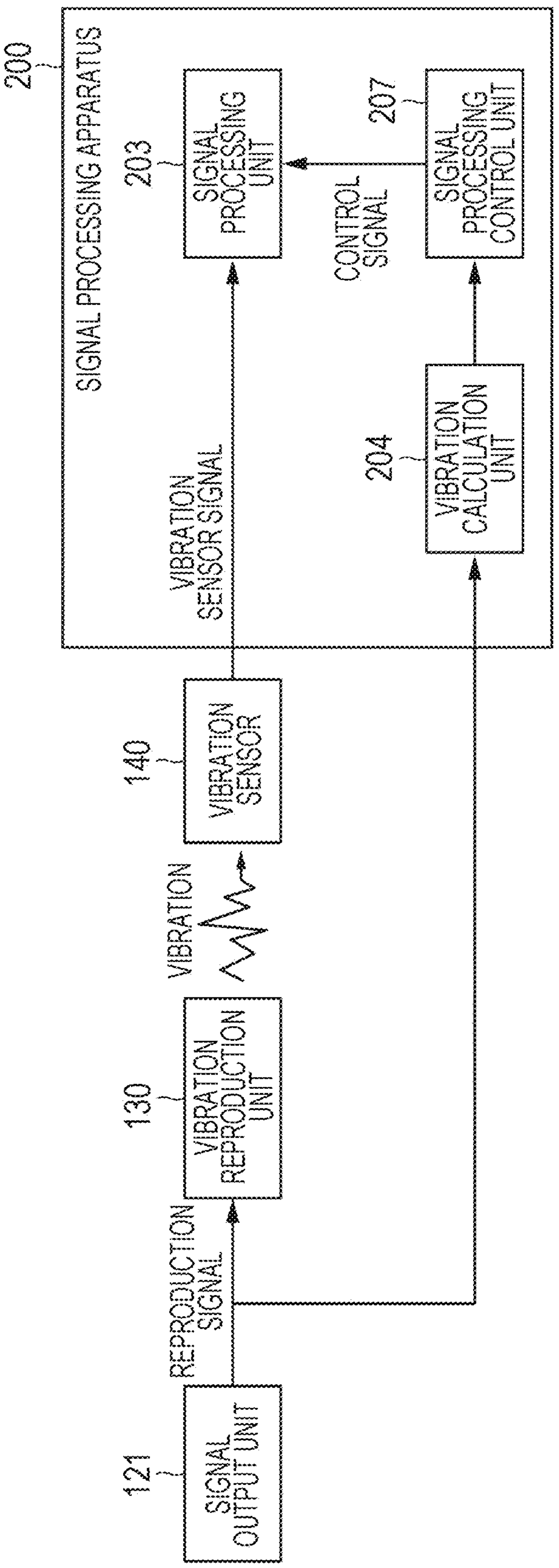
FIG. 11 is a block diagram illustrating a configuration of a signal processing apparatus 200 according to a fourth embodiment.

Next, a configuration of a signal processing apparatus 200 according to a fourth embodiment will be described with reference to FIG. 11. Configuration of a headphone 100 is similar to the configuration of the headphone 100 in the first embodiment.

The signal processing apparatus 200 includes a vibration calculation unit 204, a signal processing control unit 207, and a signal processing unit 203.

As in the second embodiment, the vibration calculation unit 204 calculates an instantaneous magnitude of a reproduction signal for outputting sound from a vibration reproduction unit 130. The vibration calculation unit 204 outputs a calculation result to the signal processing control unit 207. The magnitude of the reproduction signal includes an instantaneous magnitude, and "instantaneous" is, for example, in units of milliseconds, but the present technology is not limited thereto. The magnitude of the reproduction signal may be a peak of vibration within a predetermined time or an average within a predetermined time.

The signal processing control unit 207 performs, on the basis of a result of the calculation by the vibration calculation unit 204, control to switch on/off of operation of the signal processing unit 203. The signal processing control unit 207 performs processing of turning off the operation of the signal processing unit 203 so that an utterance is difficult to detect. In a case where a magnitude of the reproduction signal calculated by the vibration calculation unit 204 is equal to or more than a preset threshold value th2, the signal processing control unit 207 outputs a control signal for turning off the signal processing unit 203 so that the signal processing unit 203 does not perform signal processing. Meanwhile, in a case where the magnitude of the reproduction signal is not equal to or more than the threshold value th2, the signal processing unit 203 outputs a control signal for turning on the signal processing unit 203 so that the signal processing unit performs signal processing. The threshold value th2 is set to a value at which the magnitude of the reproduction signal is expected to affect signal processing using the vibration sensor signal. The signal processing control unit 207 corresponds to a processing unit in the claims.

The signal processing unit 203 detects an utterance by a wearer on the basis of the vibration sensor signal. An utterance detection method is similar to the utterance detection method in the first embodiment. The signal processing unit 203 operates only in a case where the control signal for turning on the signal processing unit 203 is received from the signal processing control unit 207.

The signal processing apparatus 200 according to the fourth embodiment is configured as described above.

[4-2. Processing by Signal Processing Apparatus 200]

Figure 12:
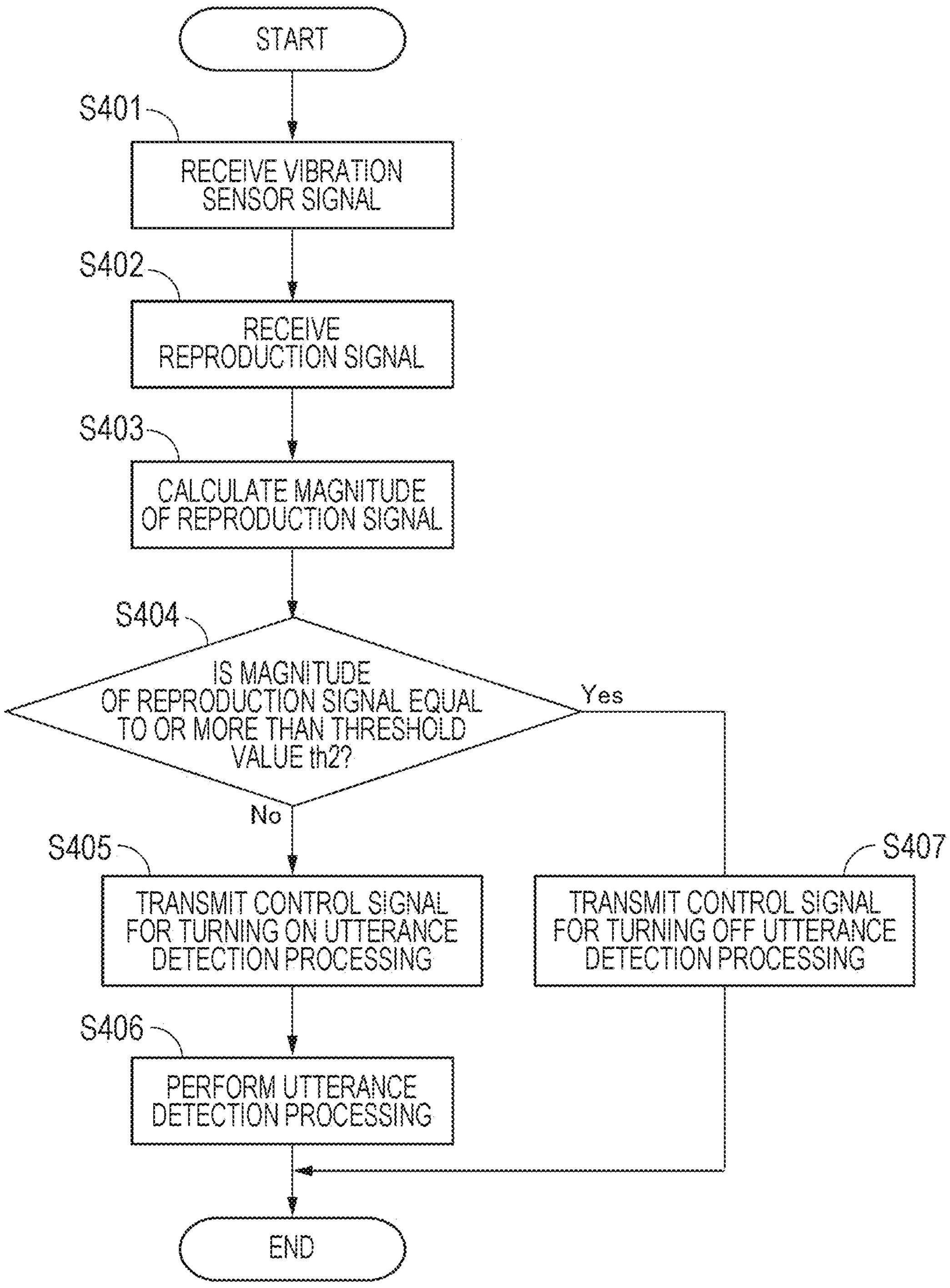
FIG. 12 is a flowchart illustrating processing by the signal processing apparatus 200 according to the fourth embodiment.

Next, a processing by the signal processing apparatus 200 according to the fourth embodiment will be described with reference to FIG. 12.

The vibration sensor 140 senses vibration of the housing 110 and outputs, to the signal processing apparatus 200, a vibration sensor signal obtained as a result of the sensing. When the vibration sensor 140 outputs a vibration sensor signal, the signal processing unit 203 receives the vibration sensor signal in Step S401.

Furthermore, in Step S402, the vibration calculation unit 204 receives a reproduction signal output from a signal output unit 121.

Next, in Step S403, the vibration calculation unit 204 calculates an instantaneous magnitude of the reproduction signal. The vibration calculation unit 204 outputs a calculation result to the signal processing unit 203.

Note that Step S403 does not necessarily need to be performed after Steps S401 and S402, and may be performed before or almost simultaneously with Steps S401 and S402.

Next, in Step S404, the signal processing control unit 207 compares the magnitude of the reproduction signal with the threshold value th2, and in a case where the magnitude of the reproduction signal is not equal to or more than the threshold value th2, the processing proceeds to Step S405 (No in Step S404).

Next, in Step S405, the signal processing control unit 207 outputs a control signal for turning on the signal processing unit 203 so that the signal processing unit 203 executes utterance detection processing.

Then, in Step S406, the signal processing unit 203 performs the utterance detection processing. In a case where the signal processing unit 203 detects an utterance by the wearer, the signal processing unit 203 outputs, to an external processing unit or the like, information indicating a result of the detection.

Meanwhile, in a case where the magnitude of the reproduction signal is equal to or more than the threshold value th2 in Step S404, the processing proceeds to Step S407 (Yes in Step S404).

Then, in Step S407, the signal processing control unit 207 outputs a control signal for turning off the signal processing unit 203 so that the signal processing unit 203 does not execute the utterance detection processing. As a result, the signal processing unit 203 does not perform the utterance detection processing.

The processing in the fourth embodiment is performed as described above. According to the fourth embodiment, signal processing is not performed by the signal processing unit 203 in a case where a magnitude of a reproduction signal is equal to or more than a threshold value th2, by which an adverse effect on a wearer due to the signal processing can be prevented.

5. Fifth Embodiment

[5-1. Configuration of Signal Processing Apparatus 200]

Figure 13:
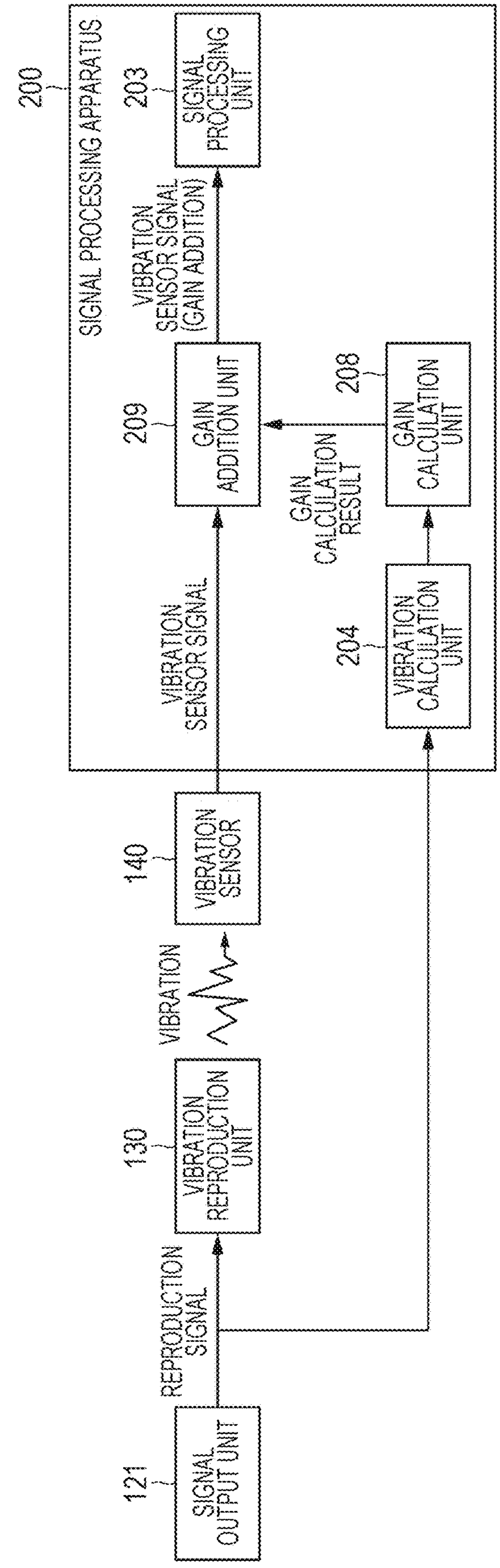
FIG. 13 is a block diagram illustrating a configuration of a signal processing apparatus 200 according to a fifth embodiment.

Next, a configuration of a signal processing apparatus 200 according to a fifth embodiment will be described with reference to FIG. 13. Configuration of a headphone 100 is similar to the configuration of the headphone 100 in the first embodiment.

The signal processing apparatus 200 includes a vibration calculation unit 204, a gain calculation unit 208, a gain addition unit 209, and a signal processing unit 203.

As in the second embodiment, the vibration calculation unit 204 calculates an instantaneous magnitude of a reproduction signal for outputting sound from a vibration reproduction unit 130. The vibration calculation unit 204 outputs a calculation result to the gain calculation unit 208. The magnitude of the reproduction signal includes an instantaneous magnitude, and "instantaneous" is, for example, in units of milliseconds, but the present technology is not limited thereto. The magnitude of the reproduction signal may be a peak of vibration within a predetermined time or an average within a predetermined time.

In a case where the magnitude of the reproduction signal calculated by the vibration calculation unit 204 is equal to or more than a preset threshold value th3, the gain calculation unit 208 calculates a gain so that the vibration sensor signal is reduced (calculates a gain smaller than 0 dB), and outputs a result of the calculation to the gain addition unit 209.

On the basis of the result of the calculation by the gain calculation unit 208, the gain addition unit 209 performs processing of multiplying the vibration sensor signal by the gain. As a result, the vibration sensor signal is reduced. The gain addition unit 209 corresponds to a processing unit in the claims.

The signal processing unit 203 detects the utterance by the wearer on the basis of the vibration sensor signal multiplied by the gain by the gain addition unit 209. The utterance detection processing is performed by a method similar to the method for the utterance detection processing in the first embodiment. In a case where the signal processing unit 203 detects an utterance by the wearer, the signal processing unit 203 outputs, to an external processing unit or the like, information indicating a result of the detection.

The signal processing apparatus 200 according to the fifth embodiment is configured as described above.

[5-2. Processing by Signal Processing Apparatus 200]

Figure 14:
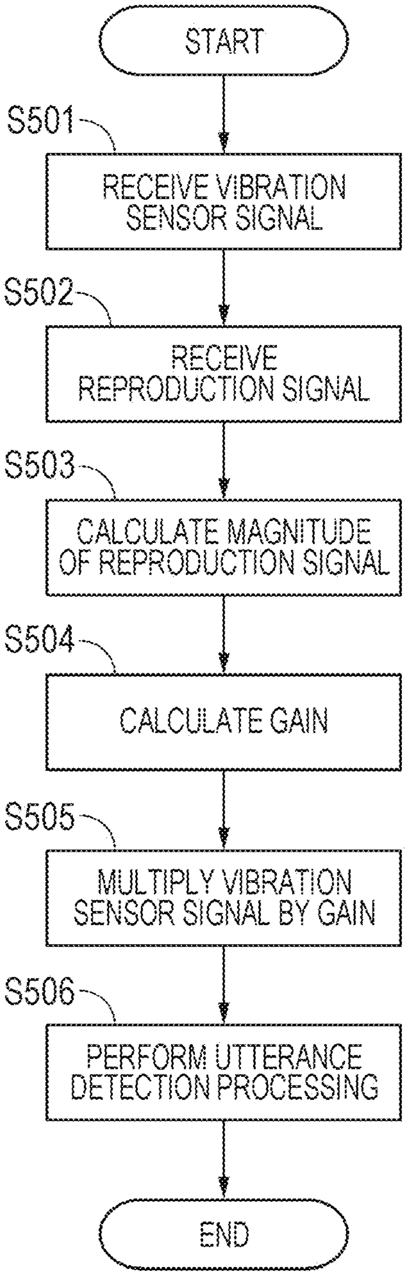
FIG. 14 is a flowchart illustrating processing by the signal processing apparatus 200 according to the fifth embodiment.

Next, processing by the signal processing apparatus 200 in the fifth embodiment will be described with reference to FIG. 14.

The vibration sensor 140 senses vibration of the housing 110 and outputs, to the signal processing apparatus 200, a vibration sensor signal obtained as a result of the sensing. When the vibration sensor 140 outputs a vibration sensor signal, the gain addition unit 209 receives the vibration sensor signal in Step S501.

Furthermore, when a reproduction signal is output from the signal output unit 121, the vibration calculation unit 204 receives the reproduction signal in Step S502.

Next, in Step S503, the vibration calculation unit 204 calculates an instantaneous magnitude of the reproduction signal. The vibration calculation unit 204 outputs a calculation result to the gain calculation unit 208. Note that Steps S502 and S503 do not necessarily need to be performed after Step S501, and may be performed before Step S501, or performed almost simultaneously with Step S501.

Next, in Step S504, in a case where the magnitude of the reproduction signal calculated by the vibration calculation unit 204 is equal to or more than a preset threshold value th3, the gain calculation unit 208 calculates a gain so that the vibration sensor signal is reduced, and outputs a result of the calculation to the gain addition unit 209.

Next, in Step S505, the gain addition unit 209 multiplies the vibration sensor signal by the gain and outputs the vibration sensor signal multiplied by the gain to the signal processing unit 203. The gain addition unit 209 performs processing of multiplying the vibration sensor signal by the gain while the vibration sensor 140 senses a vibration generated due to sound output from the vibration reproduction unit 130 and the vibration sensor signal is input to a noise addition unit 202.

Next, in Step S506, the signal processing unit 203 performs utterance detection processing on the basis of the vibration sensor signal multiplied by the gain by the gain addition unit 209. The utterance detection processing is performed by a method similar to the method for the utterance detection processing in the first embodiment. In a case where the signal processing unit 203 detects an utterance by the wearer, the signal processing unit 203 outputs, to an external processing unit or the like, information indicating a result of the detection.

The processing in the fifth embodiment is performed as described above. According to the fifth embodiment, the signal processing unit 203 performs utterance detection processing on the basis of a vibration sensor signal reduced by multiplying the vibration sensor signal by a gain, and therefore, it is possible to reduce chances of erroneously detecting that a wearer is uttering in a case where the wearer is not uttering.

Note that it is possible to reduce an amount of the gain to multiply the vibration sensor signal in the gain addition unit 209 as a magnitude of a reproduction signal calculated by the vibration calculation unit 204 increases. Furthermore, in a case where the magnitude of the reproduction signal calculated by the vibration calculation unit 204 is smaller than a predetermined value, the gain may be returned to an initial value (0 dB).

6. Sixth Embodiment

[6-1. Configuration of Signal Processing Apparatus 200]

Figure 15:
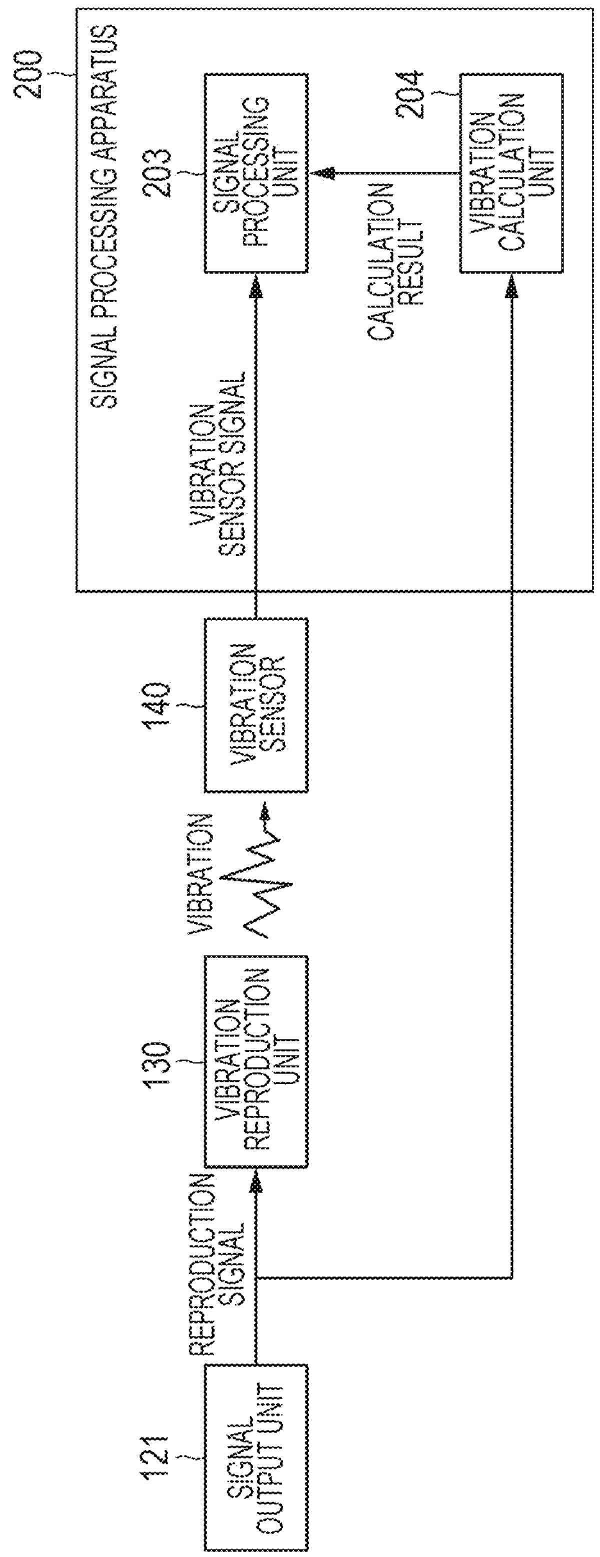
FIG. 15 is a block diagram illustrating a configuration of a signal processing apparatus 200 according to a sixth embodiment.

Next, a configuration of a signal processing apparatus 200 according to a sixth embodiment will be described with reference to FIG. 15. Configuration of a headphone 100 is similar to the configuration of the headphone 100 in the first embodiment.

The signal processing apparatus 200 includes a vibration calculation unit 204 and a signal processing unit 203.

As in the second embodiment, the vibration calculation unit 204 calculates an instantaneous magnitude of a reproduction signal for outputting sound from a vibration reproduction unit 130. The vibration calculation unit 204 outputs a calculation result to the gain calculation unit 208. The magnitude of the reproduction signal includes an instantaneous magnitude, and "instantaneous" is, for example, in units of milliseconds, but the present technology is not limited thereto. The magnitude of the reproduction signal may be a peak of vibration within a predetermined time or an average within a predetermined time.

The signal processing unit 203 detects an utterance by a wearer on the basis of the vibration sensor signal. The signal processing unit 203 corresponds to a processing unit in the claims.

The signal processing apparatus 200 according to the sixth embodiment is configured as described above.

[6-2. Processing by Signal Processing Apparatus 200]

Figure 16:
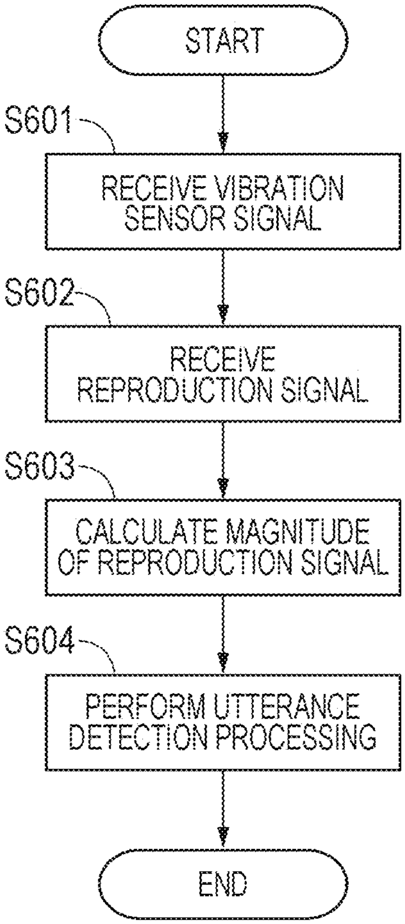
FIG. 16 is a flowchart illustrating processing by the signal processing apparatus 200 according to the sixth embodiment.

Next, processing by the signal processing apparatus 200 in the sixth embodiment will be described with reference to FIG. 16.

The vibration sensor 140 senses vibration of the housing 110 and outputs, to the signal processing apparatus 200, a vibration sensor signal obtained as a result of the sensing. When the vibration sensor 140 outputs a vibration sensor signal, the signal processing unit 203 receives the vibration sensor signal in Step S601.

Furthermore, when a reproduction signal is output from the signal output unit 121, the vibration calculation unit 204 receives the reproduction signal in Step S602.

Next, in Step S603, the vibration calculation unit 204 calculates an instantaneous magnitude of the reproduction signal. The vibration calculation unit 204 outputs a calculation result to the signal processing unit 203. Note that Steps S602 and S603 do not necessarily need to be performed after Step S601, and may be performed before Step S601, or performed almost simultaneously with Step S601.

Then, in Step S604, the signal processing unit 203 performs utterance detection processing on the basis of the vibration sensor signal. The utterance detection processing is performed by a method similar to the method for the utterance detection processing in the first embodiment. In a case where the signal processing unit 203 detects an utterance by the wearer, the signal processing unit 203 outputs, to an external processing unit or the like, information indicating a result of the detection.

In internal processing of the signal processing unit 203, a possibility that the vibration sensor signal includes human voice is calculated by using a neural network or the like, and parameters of 0 to 1 are generated. For the parameters, 0 corresponds to a 0% probability of including human voice, and 1 corresponds to a 100% probability of including human voice. The signal processing unit 203 compares the parameter with a predetermined threshold value th4, and if the parameter is equal to or more than the threshold value th4, judges that the wearer has uttered, and outputs a result of the detection indicating that the wearer has uttered. Meanwhile, in a case where the parameter is not equal to or more than the threshold value th4, it is judged that the wearer has not uttered, and a result of the detection indicating that the wearer has not uttered is output.

In this case, in a case where the magnitude of the reproduction signal calculated by the vibration calculation unit 204 is equal to or more than a preset threshold value th5, the signal processing unit 203 increases the threshold value th4 by a predetermined amount (brings the threshold value th4 close to 1), thereby making it difficult to detect an utterance by the wearer.

Moreover, the amount by which the threshold value th4 is increased may be increased as the magnitude of the reproduction signal calculated by the vibration calculation unit 204 increases. Furthermore, in a case where the magnitude of the reproduction signal calculated by the vibration calculation unit 204 is reduced below a predetermined amount, the threshold value th4 may be returned to an initial value.

The processing in the sixth embodiment is performed as described above. According to the sixth embodiment, a threshold value for judging in comparison with a parameter that a wearer has uttered is set to make it difficult to detect an utterance, and therefore, it is possible to reduce chances of erroneously detecting that the wearer is uttering in a case where the wearer is not uttering.

7. Application Example

Figure 17:
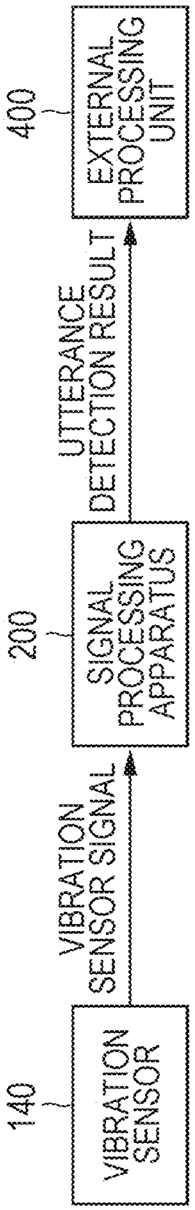
FIG. 17 is an explanatory diagram of an application example of the present technology.

In a case where a signal processing unit 203 according to the first to fourth embodiments described above has detected an utterance by a wearer, the signal processing unit 203 outputs a result of the detection to an external processing unit 400 outside of the signal processing apparatus 200 as illustrated in FIG. 17. Then, the utterance detection result can be applied to various kinds of processing in the external processing unit 400.

When the external processing unit 400 receives, from the signal processing apparatus 200, a detection result that the wearer has uttered in a state where the wearer is wearing a headphone 100 and listening to sound (music or the like) output from a vibration reproduction unit 130, the external processing unit 400 performs processing of stopping the sound output by the vibration reproduction unit 130. The sound output from the vibration reproduction unit 130 can be stopped, for example, by generating a control signal instructing an electronic device that outputs a reproduction signal to stop the output of the reproduction signal, and transmitting the control signal to the electronic device via a communication unit.

By detecting that the wearer wearing the headphone 100 and listening to the sound has uttered, and stopping the sound output from the vibration reproduction unit 130, the wearer does not need to remove the headphone 100 to talk to a person, or does not need to operate the electronic device outputting the reproduction signal to stop the sound output.

By increasing accuracy of utterance detection by the signal processing unit 203 according to the present technology, it is possible to prevent the external processing unit 400 from erroneously stopping the sound output from the vibration reproduction unit 130.

The processing performed by the external processing unit 400 is not limited to processing of stopping sound output from the vibration reproduction unit 130. As other processing, for example, there is processing of switching an operation mode of the headphone 100.

Specifically, the operation mode switching processing is processing of switching an operation mode of the headphone 100 to a so-called external-sound capturing mode in a case where the external-sound capturing mode is included in which the headphone 100 outputs, from the vibration reproduction unit 130, a microphone and sound captured by the microphone, so that the wearer can easily hear the sound.

By detecting the utterance by the wearer and switching the mode of the headphone 100 to the external-sound capturing mode according to the present technology, the wearer can talk to a person comfortably without removing the headphone 100. This is useful, for example, in a case where the wearer talks with a family member or friend, in a case where the wearer places an order orally in a restaurant or the like, in a case where the wearer talks with a cabin attendant (CA) on an airplane, or the like.

Note that the operation mode of the headphone before switching to the external-sound capturing mode may be a normal mode or a noise canceling mode.

Note that the external processing unit 400 may perform both the processing of stopping sound output from the vibration reproduction unit 130 and the processing of switching the operation mode of the headphone 100. By stopping the output of the sound from the vibration reproduction unit 130 and switching the operation mode of the headphone 100 to the external-sound capturing mode, the wearer can talk to a person more comfortably. Note that different processing units may perform the processing of stopping sound output from the vibration reproduction unit 130 and the processing of switching the operation mode of the headphone 100.

Note that the external processing unit 400 may be implemented by processing by a processor provided on the substrate 120 inside the headphone 100 or may be implemented by processing by an electronic device connected, synchronized, paired, or the like with the headphone 100, and the signal processing apparatus 200 may be provided with the external processing unit 400.

8. Modifications

Although the embodiments of the present technology have been specifically described above, the present technology is not limited to the above-described embodiments, and various modifications based on the technical idea of the present technology are possible.

The vibration reproduction apparatus including the vibration reproduction unit 130 and a vibration sensor 140 may be an earphone or a head-mounted display.

Furthermore, the "signal processing using a vibration sensor signal" performed by the signal processing unit 203 may be, for example, processing of detecting specific vibration due to, for example, an utterance by the wearer, walking, tapping, or pulses of the wearer, or the like.

In the first and second embodiments, in a case where sound pressure of sound reproduced from the vibration reproduction unit 130 is equal to or less than a predetermined threshold value th3, vibration of the housing 110 due to sound reproduced from the vibration reproduction unit 130 may not be sensed by the vibration sensor 140, or, because the vibration is small even if sensed, noise may not be added to the vibration sensor signal on assumption that signal processing is not erroneously executed.

The headphone 100 may include two or more vibration reproduction units 130 and two or more vibration sensors 140. In this case, in the first and second embodiments, noise to be added to a vibration sensor signal output from each of the vibration sensors 140 is determined on the basis of vibration reproduced from each of the vibration reproduction units 130. Furthermore, in the third embodiment, processing is performed by using a characteristic of transmission from each of the vibration reproduction units 130 to each of the vibration sensors 140.

The present technology can also have the following configurations.

(1)

A signal processing apparatus including a processing unit that

- operates corresponding to a vibration reproduction apparatus including a vibration reproduction unit that reproduces vibration and a vibration sensor that senses vibration, and
- performs processing of making it difficult to detect an utterance in utterance detection processing of detecting an utterance by a wearer of the vibration reproduction apparatus on the basis of the vibration sensor signal.

(2)

The signal processing apparatus according to (1), in which the processing unit performs the processing on the basis of a reproduction signal for reproducing vibration from the vibration reproduction unit.

(3)

The signal processing apparatus according to (1) or (2), in which the processing changes the vibration sensor signal so that the utterance is difficult to detect in the utterance detection processing.

(4)

The signal processing apparatus according to any one of (1) to (3), in which the vibration sensor detects the utterance by the wearer on the basis of the vibration sensor signal output by the vibration sensor by sensing vibration of a housing of the vibration reproduction apparatus.

(5)

The signal processing apparatus according to (3), in which the processing unit is a noise addition unit that adds noise to the vibration sensor signal.

(6)

The signal processing apparatus according to (5), the signal processing apparatus further including a vibration calculation unit that calculates a magnitude of a reproduction signal for reproducing vibration from the vibration reproduction unit in which the noise addition unit adds noise corresponding to the magnitude of the reproduction signal to the vibration sensor signal.

(7)

The signal processing apparatus according to (3), in which the processing unit is a transmission component subtraction unit that subtracts, from the vibration sensor signal, a transmission component of vibration to a vibration sensor, the vibration being reproduced by the vibration reproduction unit.

(8)

The signal processing apparatus according to (7), the signal processing apparatus further including a transmission component prediction unit that predicts the transmission component on the basis of a reproduction signal for reproducing vibration from the vibration reproduction unit, and outputs predicted the transmission component to the transmission component subtraction unit.

(9)

The signal processing apparatus according to (2), in which the processing unit is a signal processing control unit that controls on/off of the utterance detection processing.

(10)

The signal processing apparatus according to (9), in which the signal processing control unit performs control to turn off the utterance detection processing in a case where a magnitude of the reproduction signal is equal to or more than a predetermined threshold value.

(11)

The signal processing apparatus according to (9), in which the signal processing control unit performs control to turn on the utterance detection processing in a case where a magnitude of the reproduction signal is not equal to or more than a predetermined threshold value.

(12)

The signal processing apparatus according to (3), in which the processing unit is a gain addition unit that multiplies the vibration sensor signal by a gain that reduces the vibration sensor signal.

(13)

The signal processing apparatus according to (2), in which the processing unit adjusts a threshold value that judges that, on the basis of a magnitude of the reproduction signal, an utterance by the wearer is detected.

(14)

The signal processing apparatus according to any one of (1) to (13), the signal processing apparatus operating in the vibration reproduction apparatus including the vibration reproduction unit and the vibration sensor.

(15)

The signal processing apparatus according to any one of (1) to (14), in which the vibration reproduction apparatus is a headphone.

(16)

The signal processing apparatus according to any one of (1) to (15), in which the vibration sensor is an acceleration sensor.

(17)

The signal processing apparatus according to any one of (1) to (16), in which the reproduction signal is a sound signal, and the vibration reproduction unit reproduces vibration with output of sound.

(18)

A signal processing method including being executed corresponding to a vibration reproduction apparatus including a vibration reproduction unit that reproduces vibration and a vibration sensor that senses vibration, and performing processing of making it difficult to detect an utterance in utterance detection processing of detecting an utterance by a wearer of the vibration reproduction apparatus on the basis of the vibration sensor signal.

(19)

A program that causes a computer to execute a signal processing method including being executed corresponding to a vibration reproduction apparatus including a vibration reproduction unit that reproduces vibration and a vibration sensor that senses vibration, and performing processing of making it difficult to detect an utterance in utterance detection processing of detecting an utterance by a wearer of the vibration reproduction apparatus on the basis of the vibration sensor signal.

REFERENCE SIGNS LIST

100 Vibration reproduction apparatus
130 Vibration reproduction unit
140 Noise addition unit
200 Signal processing apparatus
202 Vibration sensor
203 Signal processing unit
205 Transmission component prediction unit
206 Transmission component subtraction unit
207 Signal processing control unit
209 Gain addition unit

The invention claimed is:

1. A signal processing apparatus, comprising:

a processing unit configured to:

operate corresponding to a vibration reproduction apparatus, wherein the vibration reproduction apparatus includes:

a vibration reproduction unit that reproduces vibration, and a vibration sensor that:

senses displacement in a position of a member inside the vibration sensor, senses the vibration corresponding to the sensed displacement to generate a vibration sensor signal, and outputs the vibration sensor signal to the signal processing apparatus;

execute a process to increase difficulty level of detection of an utterance in an utterance detection process, wherein the process is executed based on a reproduction signal to reproduce the vibration from the vibration reproduction unit, the utterance detection process corresponds to the detection of the utterance by a wearer of the vibration reproduction apparatus, and the utterance is detected based on a basis of the vibration sensor signal; and adjust a specific threshold value that judges based on a magnitude of the reproduction signal, the detection of the utterance by the wearer.

2. The signal processing apparatus according to claim 1, wherein the process is further configured to change the vibration sensor signal so that the utterance is difficult to detect in the utterance detection process.

3. The signal processing apparatus according to claim 1, wherein the vibration sensor detects the utterance by the wearer based on the vibration sensor signal output by the vibration sensor, and the vibration sensor senses the vibration of a housing of the vibration reproduction apparatus.

4. The signal processing apparatus according to claim 2, wherein the processing unit is a noise addition unit that is configured to add noise to the vibration sensor signal.

5. The signal processing apparatus according to claim 4, the signal processing apparatus further comprising a vibration calculation unit that is configured to calculate the magnitude of the reproduction signal, wherein the noise addition unit is further configured to add the noise, corresponding to the magnitude of the reproduction signal, to the vibration sensor signal.

6. The signal processing apparatus according to claim 2, wherein the processing unit is a transmission component subtraction unit that is configured to subtract, from the vibration sensor signal, a transmission component of the vibration to the vibration sensor.

7. The signal processing apparatus according to claim 6, the signal processing apparatus further comprising a transmission component prediction unit that is configured to:

predict the transmission component based on the reproduction signal, and output the predicted transmission component to the transmission component subtraction unit.

8. The signal processing apparatus according to claim 1, wherein the processing unit is a signal processing control unit that is configured to control on/off of the utterance detection process.

9. The signal processing apparatus according to claim 8, wherein the signal processing control unit is further configured to execute control to turn off the utterance detection process in a case where the magnitude of the reproduction signal is equal to or more than the specific threshold value.

10. The signal processing apparatus according to claim 8, wherein the signal processing control unit is further configured to execute control to turn on the utterance detection process in a case where the magnitude of the reproduction signal is not equal to or more than the specific threshold value.

11. The signal processing apparatus according to claim 2, wherein the processing unit is a gain addition unit that is configured to multiply the vibration sensor signal based on a gain that reduces the vibration sensor signal.

12. The signal processing apparatus according to claim 1, wherein the signal processing apparatus is configured to operate in the vibration reproduction apparatus.

13. The signal processing apparatus according to claim 1, wherein the vibration reproduction apparatus is a headphone.

14. The signal processing apparatus according to claim 1, wherein the vibration sensor is an acceleration sensor.

15. The signal processing apparatus according to claim 1, wherein the reproduction signal is a sound signal, and the vibration reproduction unit reproduces the vibration with output of sound.

16. A signal processing method, comprising:

operating corresponding to a vibration reproduction apparatus, wherein the vibration reproduction apparatus includes:

a vibration reproduction unit that reproduces vibration, and a vibration sensor that:

senses displacement in a position of a member inside the vibration sensor, senses the vibration corresponding to the sensed displacement to generate a vibration sensor signal, and outputs the vibration sensor signal to a signal processing apparatus;

executing a process to increase difficulty level of detection an utterance in utterance detection process, wherein the process is executed based on a reproduction signal to reproduce the vibration from the vibration reproduction unit, the utterance detection process corresponds to the detection of the utterance by a wearer of the vibration reproduction apparatus, and the utterance is detected based on the vibration sensor signal; and adjusting a specific threshold value that judges, based on a magnitude of the reproduction signal, the detection of the utterance by the wearer.

17. A non-transitory computer-readable medium having stored thereon, computer-executable instructions which, when executed by a computer, cause the computer to execute operations, the operations comprising:

operating corresponding to a vibration reproduction apparatus, wherein the vibration reproduction apparatus includes:

a vibration reproduction unit that reproduces vibration, and a vibration sensor that:

senses displacement in a position of a member inside the vibration sensor, senses the vibration corresponding to the sensed displacement to generate a vibration sensor signal, and outputs the vibration sensor signal to a signal processing apparatus;

executing a process to increase difficulty level of detection of an utterance in utterance detection process, wherein the process is executed based on a reproduction signal to reproduce the vibration from the vibration reproduction unit, the utterance detection process corresponds to the detection of the utterance by a wearer of the vibration reproduction apparatus, and the utterance is detected based on a basis of the vibration sensor signal; and adjusting a specific threshold value that judges, based on a magnitude of the reproduction signal, the detection of the utterance by the wearer.

* * * * *